US011180317B1

(12) United States Patent
Battles

(10) Patent No.: US 11,180,317 B1
(45) Date of Patent: Nov. 23, 2021

(54) ROTARY SORTATION AND STORAGE SYSTEM

(71) Applicant: Amazon Technologies, Inc., Seattle, WA (US)

(72) Inventor: Jon S. Battles, North Bend, WA (US)

(73) Assignee: Amazon Technologies, Inc., Seattle, WA (US)

(*) Notice: Subject to any disclaimer, the term of this patent is extended or adjusted under 35 U.S.C. 154(b) by 225 days.

(21) Appl. No.: 16/446,420

(22) Filed: Jun. 19, 2019

(51) Int. Cl.
*G06F 7/00* (2006.01)
*B65G 1/137* (2006.01)
*B25J 9/16* (2006.01)
*B25J 15/00* (2006.01)
*B25J 15/06* (2006.01)

(52) U.S. Cl.
CPC .......... *B65G 1/1373* (2013.01); *B25J 9/1679* (2013.01); *B25J 9/1697* (2013.01); *B25J 15/0019* (2013.01); *B25J 15/0616* (2013.01)

(58) Field of Classification Search
CPC ..... B65G 1/1373; B25J 9/1697; B25J 9/1679; B25J 15/0616; B25J 15/0019

USPC ................. 700/213–216, 218, 223–226, 228
See application file for complete search history.

(56) References Cited

U.S. PATENT DOCUMENTS 8,246,127 B1 * 8/2012 Clausen ................. A47B 57/10
312/292

* cited by examiner

*Primary Examiner* — Yolanda R Cumbess
(74) *Attorney, Agent, or Firm* — Athorus, PLLC

(57) ABSTRACT

Systems and methods related to rotary sortation and storage systems may include a central beam, and a plurality of storage modules coupled to the central beam. Each storage module may include a plurality of trays arranged around the central beam. The plurality of trays may be configured to rotate around the central beam, and each tray may also be configured to extend or retract relative to the central beam. Further, each storage module may be configured to rotate the plurality of trays around the central beam independently of other storage modules, and each tray may also be configured to extend or retract relative to the central beam independently of other trays. Accordingly, the rotary sortation and storage systems may increase storage density while also facilitating various processes with improved speed, efficiency, throughput, and flexibility.

19 Claims, 12 Drawing Sheets

ROTARY SORTATION AND STORAGE SYSTEM

BACKGROUND

Many companies may store, package, and ship items and/or groups of items from material handling facilities. For example, many companies may store items in a material handling facility and ship items to various destinations (e.g., customers, stores) from the material handling facility. Various material handling processes, including receipt, sorting, storage, picking, packing, shipping, or other processing of items within a material handling facility, often require significant space, time, and cost. Accordingly, there is a need for automated systems and methods to receive, sort, store, pick, pack, and ship items within a material handling facility with reduced space, time, and cost associated with various material handling processes.

BRIEF DESCRIPTION OF THE DRAWINGS

The detailed description is presented with reference to the accompanying figures. In the figures, the left-most digit(s) of a reference number identifies the figure in which the reference number first appears. The use of the same reference numbers in different figures indicates similar or identical components or features.

Figure 1:
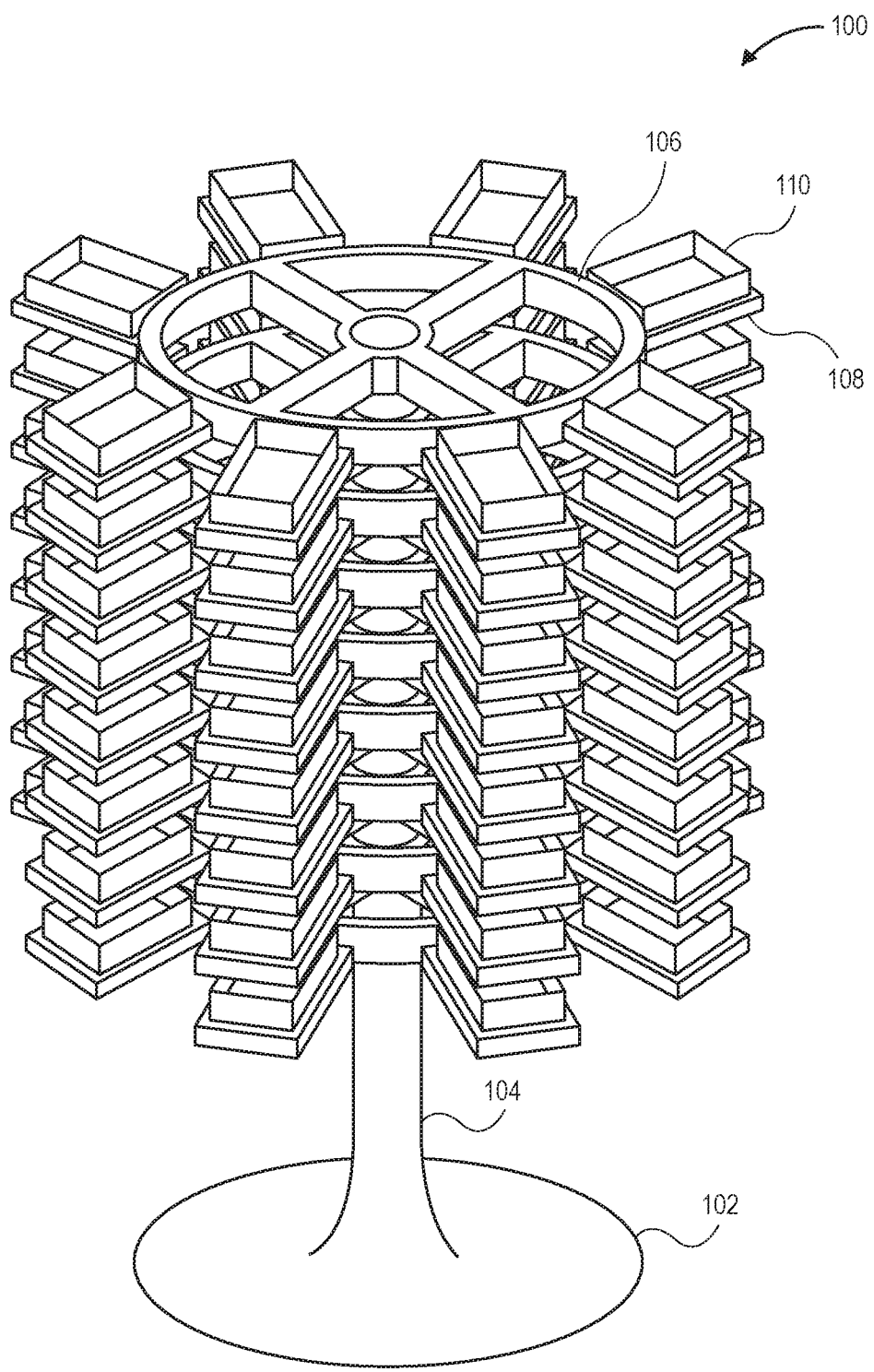
FIG. 1 is a schematic, perspective view diagram of an example rotary sortation and storage system, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein may relate to rotary sortation and storage systems to facilitate various material handling processes or operations. For example, the rotary sortation and storage systems may be used for item sortation and induction into containers for storage, to customer orders, and/or to downstream facilities or operations. In addition, the rotary sortation and storage systems may be used for item storage and picking from containers to customer orders, and/or to downstream facilities or operations. Various other item and/or container receive, sortation, induction, storage, picking, packing, shipping, and/or other material handling processes may also utilize the rotary sortation and storage systems described herein.

In example embodiments, a rotary sortation and storage system may include a central beam, pole, rod, structure, or other support member. One or more storage modules may couple to the central beam. Each storage module may include a structural portion that substantially rigidly couples to the central beam, and a rotatable portion that is configured to bidirectionally rotate around the structural portion and the central beam. In addition, each storage module may include one or more actuators or motors to bidirectionally rotate the rotatable portion. Further, each rotatable portion of each storage module may rotate substantially independently of other rotatable portions of other storage modules.

Furthermore, one or more trays may be coupled to and arranged around the rotatable portion of each storage module. Each of the one or more trays may be configured to receive a container, which may in turn receive one or more items therein. Due to the coupling of the one or more trays to rotatable portions of respective storage modules, the one or more trays may rotate around the central beam. In addition, each of the one or more trays may be configured to extend or retract substantially radially relative to the central beam. For example, each tray may include one or more actuators or motors to extend or retract the tray substantially radially relative to the central beam substantially independently of extension or retraction of other trays.

Due to the independent rotation and independent extension/retraction of the trays of respective storage modules, the storage modules and associated trays may be stacked in a substantially closed, cylindrical configuration with only minimal clearance between adjacent, vertically stacked storage modules and associated trays, in order to maximize storage density of the rotary sortation and storage system. Further, when access to a tray and associated container is desired, the storage module associated with the desired tray and associated container may rotate to enable access to the desired tray, and the desired tray may extend to enable access to the desired container.

In further example embodiments, the rotary sortation and storage system may also include one or more agents, e.g., container handling robots or item handling robots having associated end effectors, other robotic or automated apparatus, or human agents or associates. For example, one or more container handling robots may be configured to place or remove containers relative to trays of storage modules, and one or more item handling robots may be configured to induct or pick items relative to containers on trays of storage modules. Further, a control system may instruct or command various portions of the rotary sortation and storage systems described herein, including rotation of trays of storage modules, extension or retraction of trays of storage modules, placing or removing containers by agents such as container handling robots, inducting or picking items by agents such as item handling robots, capture and processing of imaging data to facilitate the various processes or operations, and/or various other processes or operations described herein.

The rotary sortation and storage systems described herein may facilitate various material handling processes while occupying less physical space within facilities as compared to conventional sortation or storage systems. In addition, the rotary sortation and storage systems described herein may increase the speed, efficiency, throughput, and/or flexibility associated with various material handling processes due to the independent rotation and independent extension/retraction of trays of storage modules. Further, various configurations of the rotary sortation and storage systems described herein may include a plurality of towers of storage modules that may be accessed by a single agent, e.g., a container and/or item handling robot, or a single tower of storage modules that may be accessed by a plurality of agents, e.g., container and/or item handling robots, as well as various other combinations of one or more towers of storage modules and one or more agents, such as container and/or item handling robots, other robotic or automated apparatus, or human agents or associates. Accordingly, the rotary sortation and storage systems described herein may be configured based at least in part on the desired physical space, speed, efficiency, throughput, and/or flexibility of the systems.

FIG. 1 is a schematic, perspective view diagram of an example rotary sortation and storage system 100, in accordance with disclosed implementations.

The example rotary sortation and storage system 100 may substantially form a tower, column, or other substantially cylindrical or prismatic structure. The system 100 may include a base 102, and a central beam, pole, rod, structure, or other support member 104 coupled at a first end, e.g., a bottom, to the base 102, and extending substantially vertically upward from the base 102. The base 102 may have any shape, in addition to the circular shape as shown in FIG. 1, including square, rectangular, polygonal, irregular, or other shapes, and/or the base 102 may include a plurality of legs, feet, or other support structures to support the system 100. In addition, the central beam 104 may also have any shape, in addition to the circular shape as shown in FIG. 1, including square, rectangular, polygonal, irregular, or other shapes. Further, the central beam 104 may extend vertically any desired height, e.g., approximately ten feet, approximately twelve feet, approximately five meters, or any other height, and may have any desired radius, thickness, width, or other dimensions, e.g., approximately one foot diameter, approximately two feet diameter, approximately one meter diameter, or any other dimension, to support the system 100. Further, the base 102 and central beam 104 may be formed of various materials, such as metals, wood, concrete, plastics, composites, and/or other materials.

One or more storage modules 106 may be coupled to the central beam 104, e.g., via clamps, collars, fasteners, pins, or other attachment elements. Each of the storage modules 106 may be substantially circular, and may include a structural portion substantially rigidly or fixedly coupled to the central beam 104 and a rotatable portion that is configured to rotate around the structural portion and the central beam 104, as further described herein. The structural portion of each storage module 106 may include structural platforms, surfaces, beams, trusses, rods, or other members that support and substantially rigidly couple the storage module 106 to the central beam 104. In addition, the storage modules 106 may be formed of various materials, such as metals, wood, plastics, composites, and/or other materials.

In addition, each of the storage modules 106 may include a plurality of trays 108 that extend substantially radially out from the rotatable portion of the storage modules 106, in which the plurality of trays 108 may be configured to support containers 110. Each storage module 106 may be sized, e.g., approximately ten feet diameter, approximately twenty feet diameter, approximately five meter diameter, or any other dimension, in order to support a desired number of trays 108 around a periphery of the storage module 106. In addition, each tray 108 may be sized in order to support a desired container 110, and each tray 108 may be configured to extend or retract substantially radially relative to the central beam 104, as further described herein. Further, the trays 108 may be formed of various materials, such as metals, wood, plastics, composites, and/or other materials. Moreover, the containers 110 may comprise various types of containers, such as totes, bins, boxes, corrugate or cardboard boxes, bags, or other types of containers.

Further, each of the storage modules 106 that may be stacked vertically along the central beam 104 to form a tower or column may be separated from each other by a minimum distance to maintain clearance between vertically adjacent storage modules 106. For example, the minimum distance or clearance may be relatively small, e.g., approximately one to two inches, approximately six inches, approximately twenty centimeters, or any other distance, to maximize storage density of the rotary sortation and storage system 100. In addition, individual access to each of the containers 110 supported by trays 108 of storage modules 106 at different vertical levels of the tower or column may be enabled by independent rotation of the trays 108 of storage modules 106 and independent extension/retraction of the trays 108 of storage modules 106.

Although FIG. 1 illustrates eight storage modules 106 stacked to form a tower or column around central beam 104, and eight trays 108 and containers 110 associated with each storage module 106, the rotary sortation and storage systems described herein may include various other numbers, sizes, or arrangements of storage modules and associated trays and containers. For example, more or fewer than eight storage modules 106 may be stacked to form a tower or column. In addition, more or fewer than eight trays 108 and containers 110 may be associated with each storage module 106, e.g., twelve trays per storage module, sixteen trays per storage module, or other numbers of trays per storage module. Further, various storage modules 106 of a single tower or column may have different numbers, sizes, or arrangements of associated trays 108 and containers 110, e.g., a first storage module may have eight trays and a second storage module may have ten trays. Furthermore, various storage modules 106 of a single tower or column may be configured to support different types of containers 110 via associated trays 108, e.g., a first storage module may support totes and a second storage module may support bags. Moreover, any single storage module 106 may also be configured to support different types of containers 110 associated with individual trays 108 of the storage module 106.

Furthermore, although FIG. 1 illustrates a substantially cylindrical arrangement of storage modules 106, trays 108, and containers 110 to form a tower, in other example embodiments, the rotary sortation and storage system may comprise other shapes or sizes to form a tower, such as a substantially triangular prism arrangement, a substantially rectangular prism arrangement, a substantially hexagonal prism arrangement, a substantially octagonal prism arrangement, or other shapes or sizes.

Figure 2:
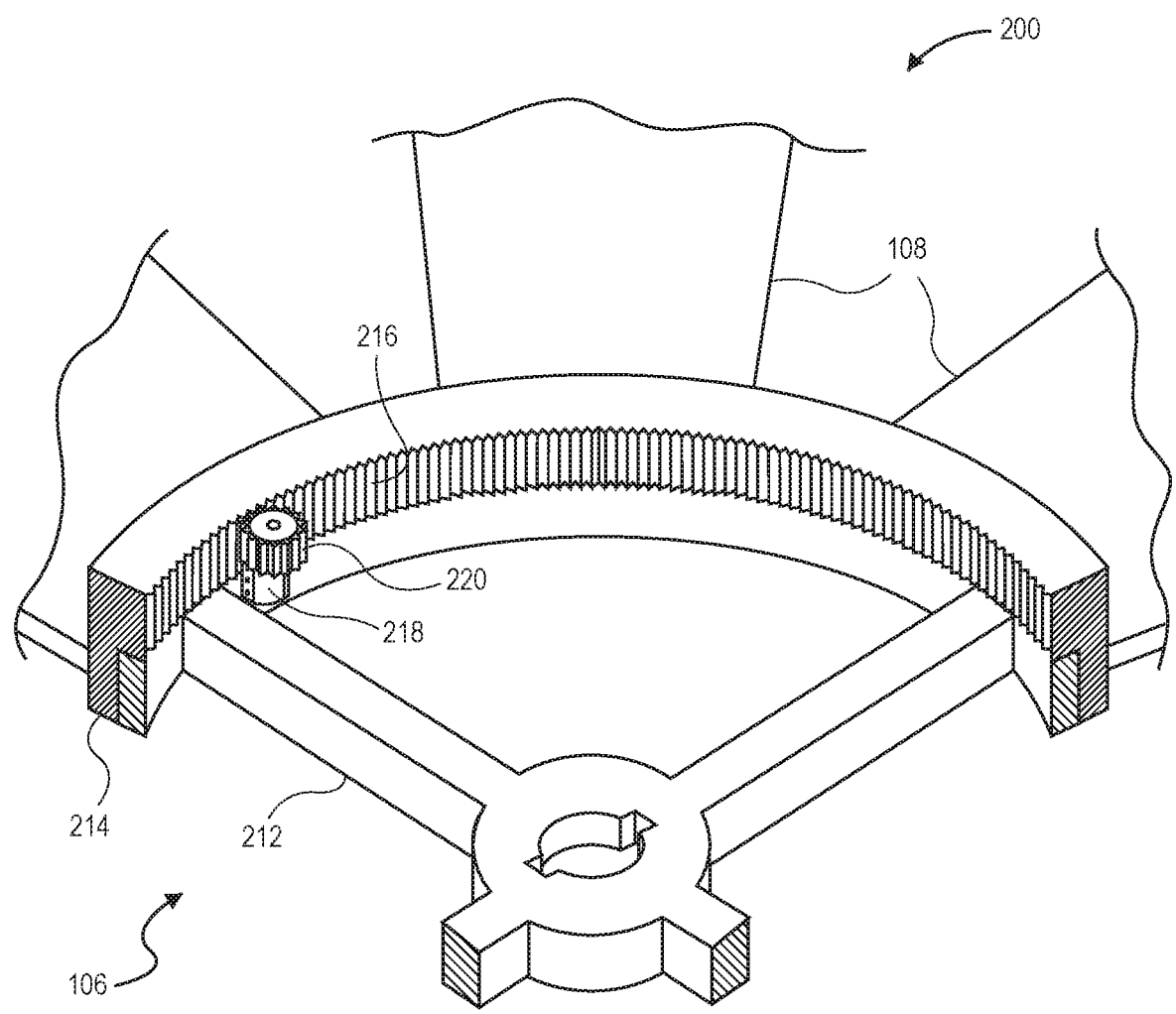
FIG. 2 is a schematic, perspective view diagram of a portion of an example storage module of an example rotary sortation and storage system, in accordance with disclosed implementations.

FIG. 2 is a schematic, perspective view diagram of a portion 200 of an example storage module of an example rotary sortation and storage system, in accordance with disclosed implementations.

As shown in FIG. 2, an example storage module 106 having one or more associated trays 108 that may form part of a tower or column of storage modules of an example rotary sortation and storage system is only partially illustrated for clarity. The storage module 106 may include a structural portion 212 that is configured to substantially rigidly or fixedly couple to a central beam 104, e.g., at a center of the structural portion 212. The connection or coupling to the central beam 104 may comprise a keyed connection (as illustrated), a splined connection, or various other types of connections or couplings to prevent rotation of the structural portion 212 relative to the central beam 104. In addition, the structural portion 212 may include a plurality of structural platforms, surfaces, beams, trusses, rods, or other members to support a rotatable portion 214 of the storage module 106.

The storage module 106 may also include the rotatable portion 214 that is configured to rotate relative to the structural portion 212 and the central beam 104. The interface between the rotatable portion 214 and the structural portion 212 may be substantially circular in order to facilitate rotation or movement of the rotatable portion 214 relative to the structural portion 212. In addition, the interface between the rotatable portion 214 and the structural portion 212 may comprise bearings, rollers, wheels, slides, channels, grooves, pins, lubricants, or other sliding or rotating elements to facilitate rotation or movement of the rotatable portion 214 relative to the structural portion 212.

Further, the rotatable portion 214 of the storage module 106 may comprise gear teeth 216 configured to mate with a gear 220 that is driven by a motor or actuator 218 that is coupled to the structural portion 212 of the storage module 106. Upon actuation of the motor 218, e.g., responsive to an instruction or command from a control system, the rotatable portion 214 of the storage module 106 may rotate relative to the structural portion 212 of the storage module 106. In addition, the motor 218 may be configured for bidirectional rotation of the rotatable portion 214 relative to the structural portion 212. Further, the angular position of the rotatable portion 214 relative to the structural portion 212 may be determined or monitored by various methods, e.g., using an encoder associated with the motor 218 and/or the gear 220, by one or more imaging sensors, photoeyes, or proximity sensors that may detect markers or other features or indicators associated with the rotatable portion 214, or by other methods. Moreover, power, data, and/or other information may be transmitted between the motor or actuator 218 and a control system via various power and/or data buses, e.g., using either wired or wireless communication technologies. In some example embodiments, rotary spline connectors may be included within portions of the storage module 106 to facilitate data and/or power transmission between the motor or actuator 218 and a control system.

Although FIG. 2 illustrates a particular configuration and arrangement of structural portion 212 and rotatable portion 214 of a storage module 106, in other example embodiments, the structural portion 212 and rotatable portion 214 may comprise various other configurations or arrangements. For example, the structural portion 212 may comprise a radially outwardly facing, C-shaped cross-section, and the rotatable portion 214 may rotate or move within the channel formed by the C-shaped cross-section, or conversely, the rotatable portion 214 may comprise a radially inwardly facing, C-shaped cross-section, and the structural portion 212 may be positioned within the channel formed by the C-shaped cross-section. In another example, the structural portion 212 and the rotatable portion 214 may substantially comprise at least partial plates or disks, in which the partial plate or disk of the rotatable portion 214 rotates relative to, e.g., on top of, the partial plate or disk of the structural portion 212.

In further example embodiments, an outer periphery of the rotatable portion 214 of the storage module 106, from which the one or more trays 108 may extend, may have shapes other than the substantially circular shape shown in FIG. 2. For example, the outer periphery of the rotatable portion 214 may comprise a substantially triangular shape, a substantially rectangular shape, a substantially hexagonal shape, a substantially octagonal shape, or other shape. As a result, the one or more trays 108 that couple to and extend from the rotatable portion 214 may correspondingly be formed in a substantially triangular shape, a substantially rectangular shape, a substantially hexagonal shape, a substantially octagonal shape, or other shape associated with the outer periphery of the rotatable portion 214.

Moreover, although FIG. 2 illustrates actuation of the rotatable portion 214 relative to the structural portion 212 via a motor 218, gear 220, and gear teeth 216 or gear track in a particular configuration or arrangement, e.g., similar to a rack and pinion gear arrangement, in other example embodiments, the motor 218, gear 220, and gear teeth 216 may be arranged in different relative positions and/or configurations to cause rotation of the rotatable portion 214 relative to the structural portion 212. In still further example embodiments, the actuation of the rotatable portion 214 relative to the structural portion 212 may be achieved using various other types, arrangements, or configurations of motors, actuators, gears, and/or other actuation systems and methods, such as using drive rollers and channels, cables and pulleys, other geared arrangements, rotary actuators, and/or combinations thereof.

Figure 3:
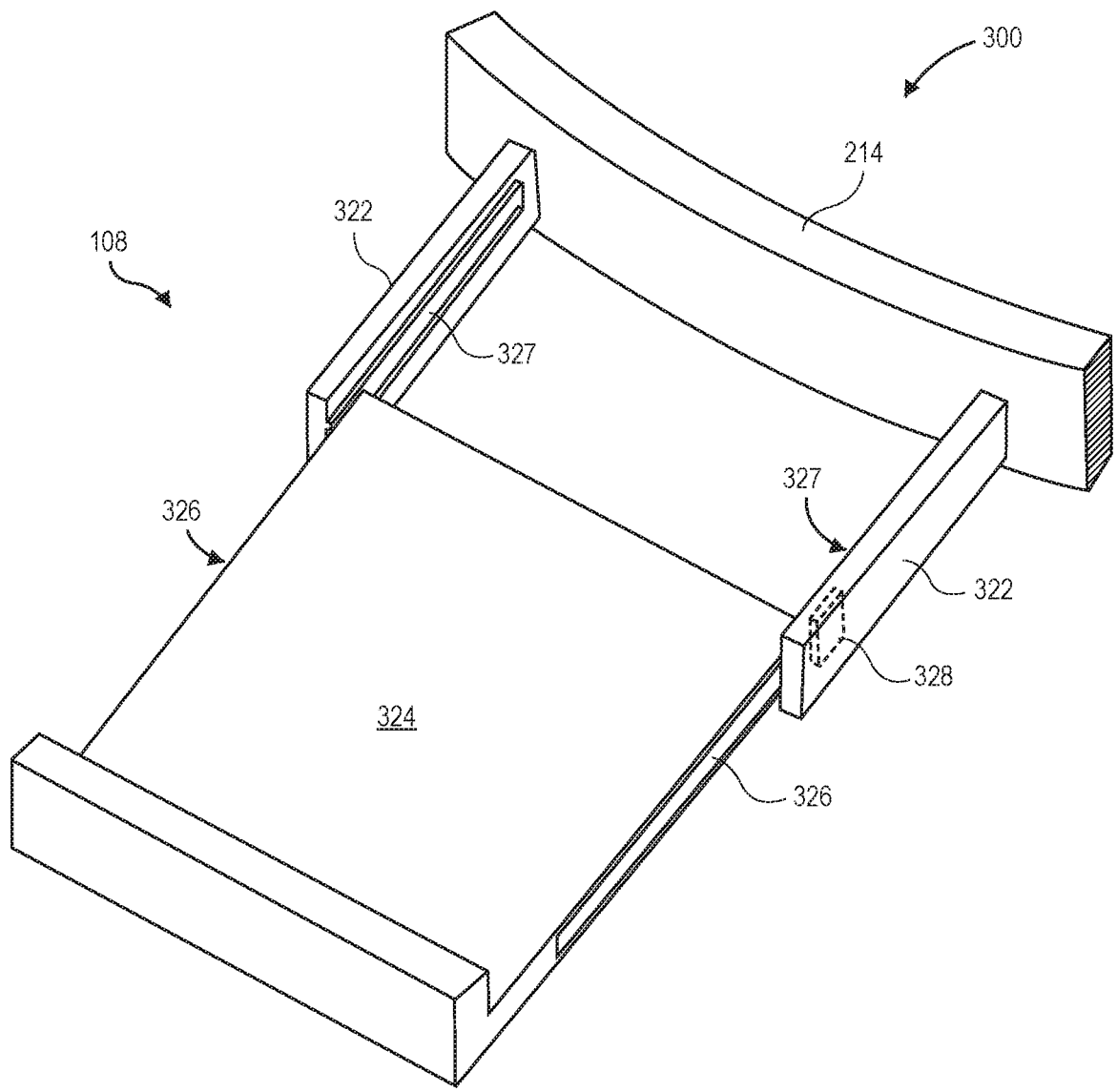
FIG. 3 is a schematic, perspective view diagram of a portion of an example tray of an example rotary sortation and storage system, in accordance with disclosed implementations.

FIG. 3 is a schematic, perspective view diagram of a portion 300 of an example tray of an example rotary sortation and storage system, in accordance with disclosed implementations.

As shown in FIG. 3, an example tray 108 that may be configured to receive a container and that may form part of a tower or column of storage modules and associated trays of an example rotary sortation and storage system is illustrated in isolation for clarity. The example tray 108 may couple to a portion of a storage module, e.g., to rotatable portion 214 of a storage module, such that the tray 108 may rotate together with the rotatable portion 214 around a structural portion of the storage module and the central beam 104. The example tray 108 may include a fixed portion 322 and a movable portion 324, in which the fixed portion 322 may couple to the rotatable portion 214 of the storage module, e.g., at first ends of the fixed portion 322.

The movable portion 324 of the example tray 108 may comprise a platform, area, or other surface that is configured to receive one or more types of containers. For example, the movable portion 324 may be configured to receive totes, bins, boxes, corrugate or cardboard boxes, bags, or other types of containers. In example embodiments, various types of containers, such as totes, bins, or boxes, may be placed on the movable portion 324. In addition, the fixed portion 322 and/or the movable portion 324 may comprise upstanding flanges, edges, rails, or guides around a periphery of the example tray 108 to maintain a received container on the example tray 108. In other example embodiments, various types of containers, such as bags, may be supported by one or more hooks, hangers, or other suspending elements associated with the movable portion 324. Further, the movable portion 324 may comprise one or more openings on its surface for embodiments in which the movable portion 324 is configured to receive bags or other suspended containers.

The movable portion 324 of the example tray 108 may couple to the fixed portion 322 via one or more slides, guides, or channels 326, 327, e.g., similar to a drawer slide arrangement. For example, first sections 326 of the slides may couple to sides of the movable portion 324, second sections 327 of the slides may couple to sides of the fixed portion 322, and the first sections 326 may be configured to slide or glide within or relative to the second sections 327 of the slides. In example embodiments, the slides 326, 327 may comprise one or more bearings, rollers, wheels, channels, grooves, pins, lubricants, or other sliding or linearly movable elements to facilitate extension and retraction of the first sections 326 relative to the second sections 327 of the slides.

Further, an actuator or motor 328 may be associated with the slides 326, 327 and configured to cause extension or retraction of the first sections 326 relative to the second sections 327 of the slides. Upon actuation of the motor 328, e.g., responsive to an instruction or command from a control system, the first sections 326 of the slides coupled to the movable portion 324 of the example tray 108 may extend or retract relative to the second sections 327 of the slides coupled to the fixed portion 322 of the example tray 108. For example, the actuator or motor 328 may comprise a servo, solenoid, motor, rack and pinion arrangement, worm screw arrangement, other geared arrangements, rotary actuators, linear actuators, or various other types of actuators to cause extension or retraction of the first sections 326 relative to the second sections 327 of the slides. Further, the extended or retracted position of the movable portion 324 relative to the fixed portion 322 of the example tray 108 may be determined or monitored by various methods, e.g., using an encoder associated with the motor 328, by one or more imaging sensors, photoeyes, or proximity sensors that may detect markers or other features or indicators associated with the movable portion 324, or by other methods. Moreover, power, data, and/or other information may be transmitted between the motor or actuator 328 and a control system via various power and/or data buses, e.g., using either wired or wireless communication technologies. In some example embodiments, rotary spline connectors may be included within portions of the storage module 106 and example tray 108 to facilitate data and/or power transmission between the motor or actuator 328 and a control system.

Although FIG. 3 illustrates a particular configuration and arrangement of fixed portion 322 and movable portion 324 of an example tray 108, in other example embodiments, the fixed portion 322 and movable portion 324 may comprise various other configurations or arrangements. For example, the fixed portion 322 may comprise a C-shaped cross-section, and the movable portion 324 may extend or retract within the channel formed by the C-shaped cross-section, or conversely, the movable portion 324 may comprise a C-shaped cross-section, and the fixed portion 322 may be positioned within the channel formed by the C-shaped cross-section. In another example, the fixed portion 322 and the movable portion 324 may substantially comprise at least partial plates or surfaces, in which the partial plate or surface of the movable portion 324 extends or retracts relative to, e.g., on top of, the partial plate or surface of the fixed portion 322.

In further example embodiments, the one or more trays 108 coupled to the rotatable portion 214 of the storage module 106 may have shapes other than the substantially square or rectangular shape shown in FIG. 3. For example, the example tray 108 may comprise a substantially oval or circular shape, a substantially triangular shape, a substantially hexagonal shape, a substantially octagonal shape, or other shape. Further, the one or more trays 108 may be sized or shaped based at least in part on various types of containers to be received by the one or more trays 108.

Moreover, although FIG. 3 illustrates actuation of the movable portion 324 relative to the fixed portion 322 of the example tray 108 via a motor or actuator 328 and first and second sections 326, 327 of slides or guides in a particular configuration or arrangement, e.g., similar to a drawer slide arrangement, in other example embodiments, the motor 328 and first and second sections 326, 327 of slides may be arranged in different relative positions and/or configurations to cause extension or retraction of the movable portion 324 relative to the fixed portion 322 of the example tray 108. In still further example embodiments, the actuation of the movable portion 324 relative to the fixed portion 322 of the example tray 108 may be achieved using various other types, arrangements, or configurations of motors, actuators, gears, and/or other actuation systems and methods, such as using drive rollers and channels, cables and pulleys, other geared arrangements, telescoping arrangements, scissor lift arrangements, rotary actuators, linear actuators, and/or combinations thereof.

Figure 4:
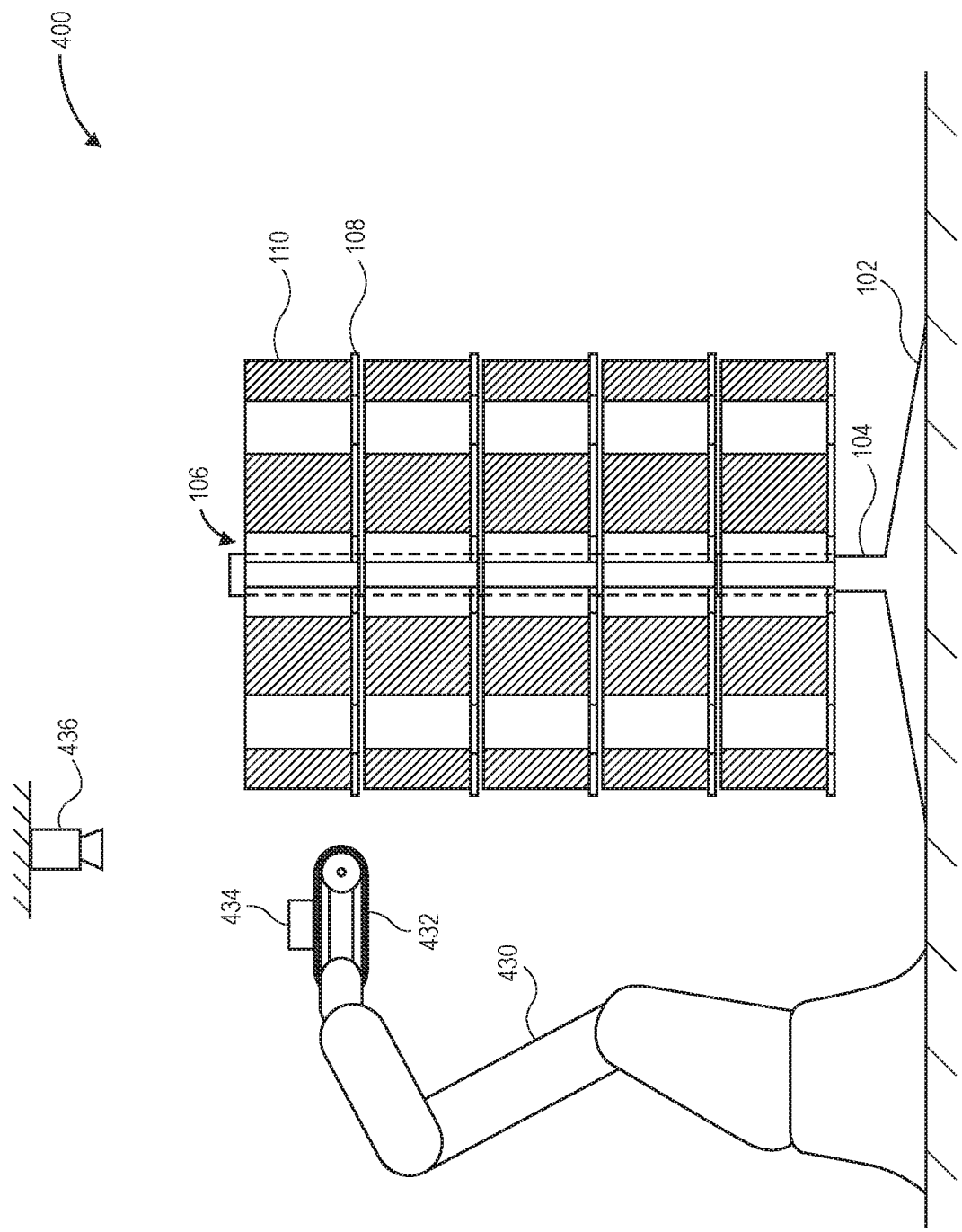
FIG. 4 is a schematic, side view diagram of an example rotary sortation and storage system with an example container or item handling robot, in accordance with disclosed implementations.

FIG. 4 is a schematic, side view diagram of an example rotary sortation and storage system 400 with an example container or item handling robot, in accordance with disclosed implementations.

The example rotary sortation and storage system 400 may include a base 102, a central beam 104, one or more storage modules 106 coupled to the central beam 104, one or more trays 108 coupled to respective storage modules 106, and one or more containers 110 associated with respective trays 108. For clarity of illustration, outwardly facing surfaces, or surfaces associated with an outer periphery, of the one or more containers 110 are shown as shaded in FIG. 4. The example rotary sortation and storage system 400 may include any and all of the features of example rotary sortation and storage systems, example storage modules, and example trays described herein with respect to FIGS. 1-3. In addition, as described herein, each of the plurality of storage modules 106 may be configured to rotate independently of others of the plurality of storage modules 106, and each of the trays 108 of respective storage modules 106 may be configured to extend or retract independently of others of the plurality of trays 108.

As shown in FIG. 4, the system 400 may also include an agent, such as a robotic arm or manipulator 430 having an associated end effector 432. For example, the robotic arm 430 may comprise a six-axis robotic arm or manipulator, or other types of robotic arms or manipulators, such as cylindrical, spherical, polar, articulated, cartesian, or other types. In addition, the end effector 432 may comprise various types of end effectors, such as grasping arms, container forks, suction grippers, crossbelt sorters or conveyors, electroadhesive elements, electromagnetic elements, or various other types of end effectors.

Further, the robotic arm 430 and associated end effector 432 may be configured as a container handling robot configured to place or remove containers 110 relative to trays 108 of the system 400. In such embodiments, the end effector 432 may comprise grasping arms, container forks, crossbelt sorters or conveyors, or other end effectors that are sized or shaped to place or remove containers 110. For example, container forks may include a pair of forks or arms with a defined distance therebetween that is configured to facilitate lifting and placing containers 110, such as totes, bins, or boxes.

In addition, the robotic arm 430 and associated end effector 432 may be configured as an item handling robot configured to induct or pick items, such as item 434, relative to containers 110 associated with trays 108 of the system 400. In such embodiments, the end effector 432 may comprise grasping arms, suction grippers, crossbelt sorters or conveyors, or other end effectors that are sized or shaped to induct or pick items to or from containers 110. For example, one or more grasping arms or crossbelt conveyors may receive items that are to be inducted into or picked from respective containers 110 of the system 400.

As further shown in FIG. 4, the system 400 may also include an imaging device 436. For example, the imaging device 436 may comprise a camera, a video camera, an imaging sensor, a depth or range imaging sensor, or other image capture device having a field of view that includes an interface between the robotic arm 430 and one or more trays 108 and associated containers 110 of a tower of storage modules 106. The imaging device 436 may capture imaging data during various operations or processes of the system 400, including placement of a container 110 onto a tray 108 of a storage module 106 by a container handling robot, removal of a container 110 from a tray 108 of a storage module 106 by a container handling robot, induction or placement of an item into a container 110 of a tray 108 of a storage module 106 by an item handling robot, picking or removal of an item from a container 110 of a tray 108 of a storage module 106 by an item handling robot, and/or various other operations or processes.

The imaging data may be processed and analyzed by a control system to facilitate the various operations and processes, e.g., identifying a container, determining a container placement location on a tray, determining a container removal location from a tray, identifying an item within a container, determining item density within a container, determining an item induct or placement location in a container, determining an item picking or removal location from a container, identifying errors in one or more operations, identifying incorrect container placement or removal, identifying incorrect item placement or removal, identifying items that protrude or stick out from a container, confirming completion of one or more operations, and/or various other processing and analysis of the imaging data. Further, responsive to the determination of one or more errors based on the imaging data, a control system may instruct various quality control or error mitigation operations or processes, such as removing incorrectly placed containers, replacing incorrectly removed containers, removing containers in which items have been incorrectly placed, removing incorrectly placed items, moving or adjusting protruding items, replacing incorrectly removed items, updating associations between towers, storage modules, trays, containers, and/or items, transferring containers and/or items to error correction stations or agents, and/or various other quality control processes and operations.

During the various operations or processes involving interactions between a robotic arm 430 and a tower of storage modules 106 having associated trays 108 and containers 110, a tray 108 and/or container 110 of interest may be identified, e.g., based on stored data associated with the storage modules, trays, containers, and/or items stored therein. In addition, a storage module 106 associated with the tray 108 and/or container 110 of interest may also be identified, e.g., based on stored data associated with the storage modules, trays, containers, and/or items stored therein. Then, the identified storage module 106 may be instructed or commanded to rotate, by a control system, in order to enable access to the tray 108 and/or container 110 of interest by the robotic arm 430. Then, the identified tray 108 may be instructed or commanded to extend, by a control system, in order to enable access to the tray 108 and/or the container 110 of interest by the robotic arm 430. Then, the robotic arm 430 may be instructed or commanded, by a control system and potentially based at least in part on imaging data captured by the imaging device 436 and processed by the control system, to perform one or more operations or processes, such as placing or removing containers on the tray 108 of interest and/or inducting or picking items in the container 110 of interest. Upon completion of the one or more operations or processes by the robotic arm 430 with respect to the tray 108 and/or container 110 of interest, the identified tray 108 may be instructed or commanded to retract, by a control system, in order to disable or prevent access to the tray 108 and/or the container 110 by the robotic arm 430.

Figure 5:
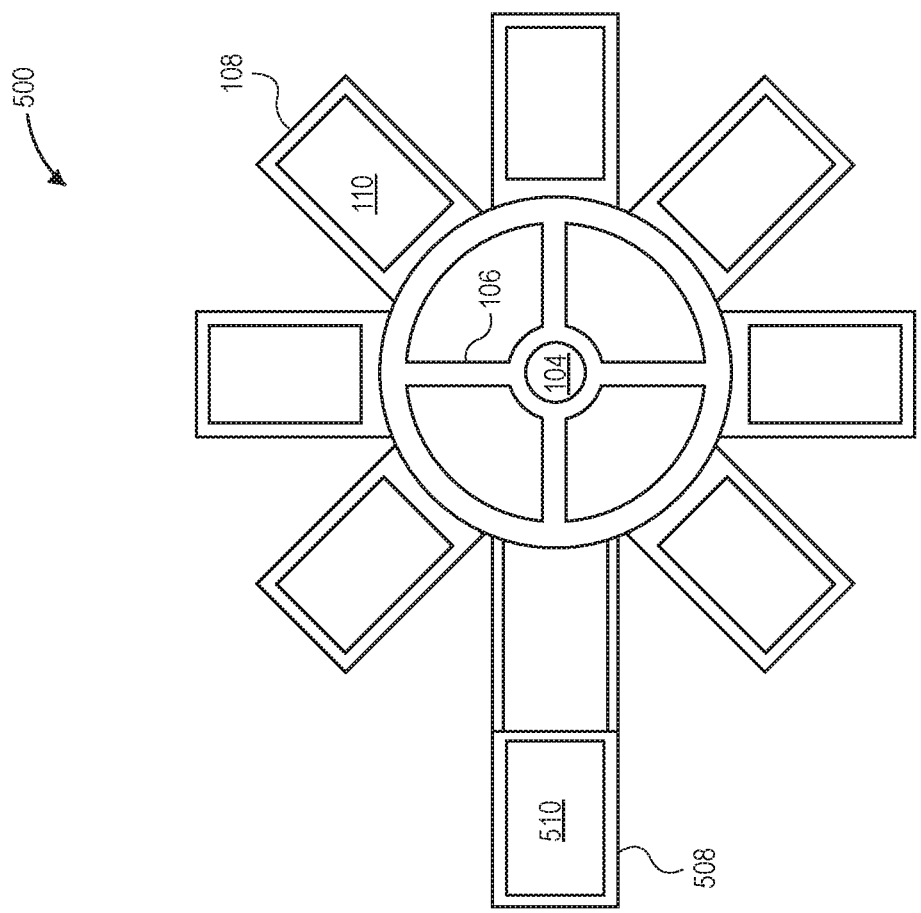
FIG. 5 is a schematic, overhead view diagram of an example rotary sortation and storage system with an example container or item handling robot, in accordance with disclosed implementations.
Figure 5:
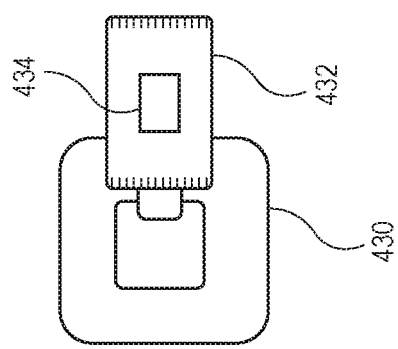

FIG. 5 is a schematic, overhead view diagram of an example rotary sortation and storage system 500 with an example container or item handling robot, in accordance with disclosed implementations. The overhead view diagram of FIG. 5 may substantially correspond to the side view diagram of FIG. 4.

The example rotary sortation and storage system 500 may include a base (not shown), a central beam 104, one or more storage modules 106 coupled to the central beam 104, one or more trays 108 coupled to respective storage modules 106, one or more containers 110 associated with respective trays 108, an agent such as a robotic arm 430, and an overhead imaging device (not shown). The example rotary sortation and storage system 500 may include any and all of the features of example rotary sortation and storage systems, example storage modules, example trays, example robotic arms, and example imaging devices described herein with respect to FIGS. 1-4. In addition, as described herein, each of the plurality of storage modules 106 may be configured to rotate independently of others of the plurality of storage modules 106, and each of the trays 108 of respective storage modules 106 may be configured to extend or retract independently of others of the plurality of trays 108.

As described at least with respect to FIG. 4, during the various operations or processes involving interactions between a robotic arm 430 and a tower of storage modules 106 having associated trays 108 and containers 110, a tray 508 and/or container 510 of interest may be identified, e.g., based on stored data associated with the storage modules, trays, containers, and/or items stored therein. In addition, a storage module 106 associated with the tray 508 and/or container 510 of interest may also be identified, e.g., based on stored data associated with the storage modules, trays, containers, and/or items stored therein. Then, the identified storage module 106 may be instructed or commanded to rotate, by a control system, in order to enable access to the tray 508 and/or container 510 of interest by the robotic arm 430, as shown in FIG. 5. Further, the identified tray 508 may be instructed or commanded to extend, by a control system, in order to enable access to the tray 508 and/or the container 510 of interest by the robotic arm 430, as shown in FIG. 5. Then, the robotic arm 430 may be instructed or commanded, by a control system and potentially based at least in part on imaging data captured by the imaging device 436 and processed by the control system, to perform one or more operations or processes, such as placing or removing containers on the tray 508 of interest and/or inducting or picking items in the container 510 of interest. Upon completion of the one or more operations or processes by the robotic arm 430 with respect to the tray 508 and/or container 510 of interest, the identified tray 508 may be instructed or commanded to retract, by a control system, in order to disable or prevent access to the tray 508 and/or the container 510 by the robotic arm 430.

An imaging device, such as overhead imaging device 436 shown in FIG. 4, may have a field of view that includes at least a portion or substantially all of an extended tray 508 and/or container 510, as shown in FIG. 5. In addition, the field of the view of the overhead imaging device 436 may also include at least a portion or substantially all of the robotic arm 430 and associated end effector 432. Further, if a position of the robotic arm 430 is substantially stationary, and due to the independent rotation and independent extension or retraction of trays of storage modules, a selected tray and associated container of a storage module at any level of a tower of storage modules that is rotated toward the position of the robotic arm 430 and extended substantially radially out from the tower toward the position of the robotic arm 430 may be placed at least partially or substantially completely within a field of view of the overhead imaging device 436 to capture imaging data of various operations or processes to be performed with respect to the selected tray and associated container.

Due to the independent rotation of each of the storage modules relative to others of the storage modules, trays and/or containers of interest associated with different storage modules may be independently rotated or moved to facilitate operations or processes by one or more robotic arms. In addition, due to the independent extension and retraction of each of the trays of storage modules relative to other trays of the storage modules, trays and/or containers of interest may be independently extended or retracted to facilitate operations or processes by one or more robotic arms.

Thus, although FIGS. 4 and 5 illustrate only a single tower of storage modules having associated trays and containers, only a single robotic arm and associated end effector, and only a single imaging device having a field of view including an interface between the robotic arm and the tower, in other example embodiments, various other numbers, configurations, and/or arrangements of one or more towers of storage modules, one or more robotic arms, and/or one or more imaging devices may be used to form a rotary sortation and storage system.

For example, a plurality of robotic arms may be configured to perform operations and processes with respect to a single tower of storage modules, and due to the independent rotation of the storage modules and independent extension/retraction of trays of the storage modules, each of the plurality of robotic arms may perform operations and processes substantially independently and concurrently with respect to different trays and/or containers of the single tower of storage modules. In addition, a single robotic arm may be configured to perform operations and processes with respect to a plurality of towers of storage modules, and due to the independent rotation of the storage modules and independent extension/retraction of trays of the storage modules, each tower of storage modules may perform operations and processes substantially independently and concurrently with respect to other towers to facilitate interactions and manipulations by the single robotic arm. Further variations or combinations of numbers, configurations, and/or arrangements of example rotary sortation and storage systems are described herein at least with respect to FIGS. 7A and 7B.

Figure 6C:
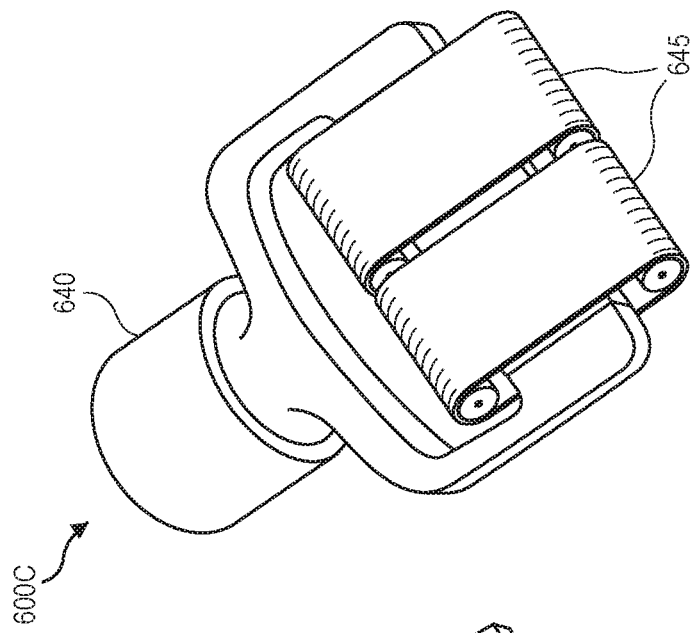
FIGS. 6A-6C are schematic, perspective view diagrams of example end effectors of an example container or item handling robot of an example rotary sortation and storage system, in accordance with disclosed implementations.
Figure 6B:
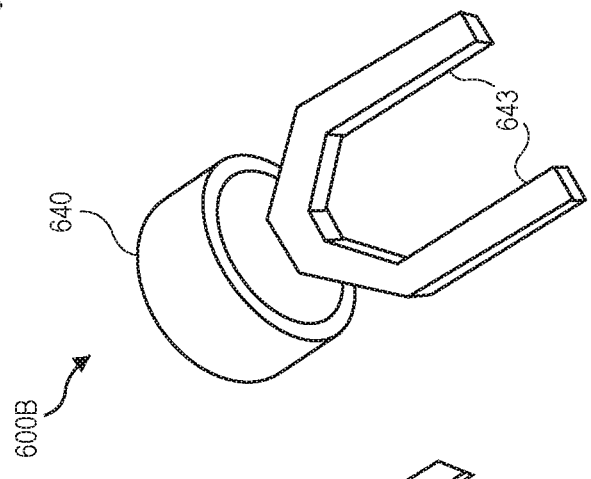
Figure 6A:
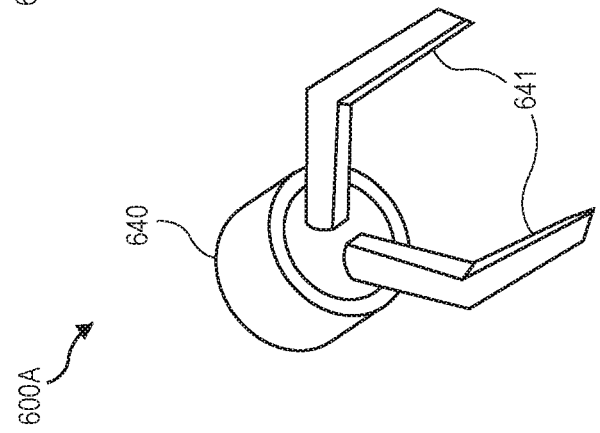

FIGS. 6A-6C are schematic, perspective view diagrams of example end effectors 600A-600C of an example container or item handling robot of an example rotary sortation and storage system, in accordance with disclosed implementations.

As shown in FIG. 6A, the example end effector 600A may include a coupling 640 to mechanically and electrically couple to a robotic arm. In addition, the example end effector 600A may include a pair of grasping arms or fingers 641. In example embodiments, the grasping arms 641 may be sized or shaped to grasp or lift items, products, or other objects. In other example embodiments, the grasping arms 641 may be sized or shaped to grasp or lift containers, such as totes, bins, boxes, bags, or other containers. The example end effector 600A having grasping arms 641 may be coupled to a robotic arm and used for various of the operations or processes described herein with respect to rotary sortation and storage systems.

As shown in FIG. 6B, the example end effector 600B may include a coupling 640 to mechanically and electrically couple to a robotic arm. In addition, the example end effector 600B may include a pair of forks or arm 643. In example embodiments, the forks 643 may be sized or shaped to lift or place items, products, or other objects. In other example embodiments, the forks 643 may be sized or shaped to lift or place containers, such as totes, bins, boxes, bags, or other containers. For example, the forks 643 may be configured with a defined distance therebetween to lift containers such as totes by edges, flanges, lips, or other surfaces or portions of the totes. The example end effector 600B having a pair of forks 643 may be coupled to a robotic arm and used for various of the operations or processes described herein with respect to rotary sortation and storage systems.

As shown in FIG. 6C, the example end effector 600C may include a coupling 640 to mechanically and electrically couple to a robotic arm. In addition, the example end effector 60CB may include one or more crossbelt conveyors 645, e.g., two crossbelt conveyors as shown in FIG. 6C. In example embodiments, the crossbelt conveyors 645 may be sized or shaped to lift or place items, products, or other objects. In other example embodiments, the crossbelt conveyors 645 may be sized or shaped to lift or place containers, such as totes, bins, boxes, bags, or other containers. For example, the crossbelt conveyors 645 may be configured to receive items or containers onto movable surfaces or belts and place items or containers from movable surfaces or belts of the crossbelt conveyors 645. In addition, the example end effector 600C may include one or more guides, rails, or walls, e.g., along three sides of each of the crossbelt conveyors 645, to prevent items or containers from inadvertently sliding or falling off the crossbelt conveyors 645. The example end effector 600C having one or more crossbelt conveyors 645 may be coupled to a robotic arm and used for various of the operations or processes described herein with respect to rotary sortation and storage systems.

Although not illustrated in FIGS. 6A-6C, various other types of end effectors may also be used for various of the operations or processes described herein with respect to rotary sortation and storage systems, such as suction grippers that may grasp or lift items or containers using air or pneumatic vacuum or suction, electroadhesive elements that may grasp or lift items or containers using electroadhesion, electromagnetic elements that may grasp or lift items or containers using (electro)magnetism, and/or other types of end effectors.

Figure 7B:
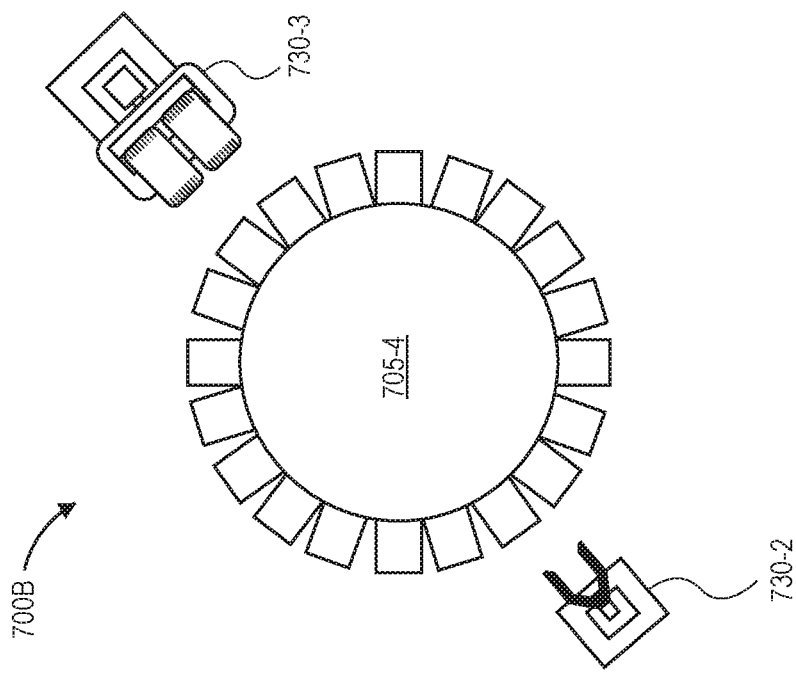
FIGS. 7A and 7B are schematic, overhead view diagrams of example combinations of example rotary sortation and storage systems, in accordance with disclosed implementations.
Figure 7A:
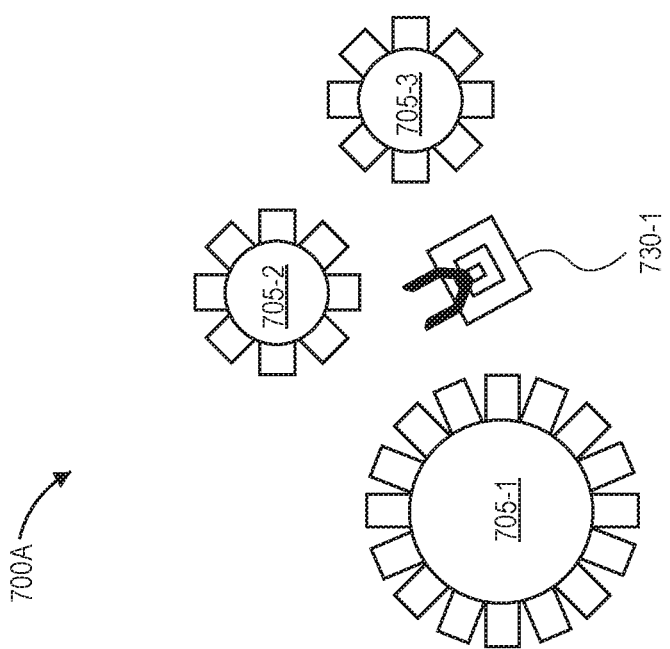

FIGS. 7A and 7B are schematic, overhead view diagrams of example combinations 700A, 700B of example rotary sortation and storage systems, in accordance with disclosed implementations.

As shown in FIG. 7A, the example rotary sortation and storage system may include a single agent, such as a robotic arm 730-1 and a plurality of towers 705 of storage modules having associated trays and containers, e.g., three towers 705-1, 705-2, 705-3. In addition, the example rotary sortation and storage system may also include one or more imaging devices to capture imaging data that may be processed to facilitate various operations and processes as described herein.

The single robotic arm 730-1 may have one or more associated end effectors that are configured to grasp and lift items into or from containers, and/or that are configured to grasp and lift containers to or from trays. Each of the towers 705 may rotate respective storage modules independently, and each of the towers 705 may also extend or retract respective trays independently. Therefore, for example, while the robotic arm 730-1 is performing operations or processes with respect to an extended tray of a storage module of a first tower 705-1, one or both of the other towers 705-2, 705-3 may rotate respective storage modules and extend or retract respective trays to facilitate further or subsequent operations or processes by the robotic arm 730-1. In this manner, the speed, efficiency, and/or throughput of the rotary sortation and storage system may be improved, optimized, or maximized, e.g., to maximize utilization of the robotic arm, while also meeting cycle times and/or downstream demand for the rotary sortation and storage system.

As shown in FIG. 7B, the example rotary sortation and storage system may include a plurality of agents, such as robotic arms 730, e.g., two robotic arms 730-2, 730-3, and a single tower 705-4 of storage modules having associated trays and containers. In addition, the example rotary sortation and storage system may also include one or more imaging devices to capture imaging data that may be processed to facilitate various operations and processes as described herein.

The plurality of robotic arms 730-2, 730-3 may each have one or more associated end effectors that are configured to grasp and lift items into or from containers, and/or that are configured to grasp and lift containers to or from trays. The tower 705-4 may rotate respective storage modules independently, and the tower 705-4 may also extend or retract respective trays independently. Therefore, for example, while the first robotic arm 730-2 is performing operations or processes with respect to a first extended tray of a first storage module of the tower 705-4, the second robotic arm 730-3 may substantially independently and concurrently perform operations or processes with respect to a second extended tray of a second storage module of the tower 705-4. In this manner, the speed, efficiency, and/or throughput of the rotary sortation and storage system may be improved, optimized, or maximized, e.g., to maximize utilization of the tower 705-4 of storage modules, while also meeting cycle times and/or downstream demand for the rotary sortation and storage system.

In other example embodiments, various other combinations, configurations, and arrangements of one or more towers of storage modules and one or more agents, such as robotic arms, other robotic or automated apparatus, or human agents or associates, potentially in combination with one or more imaging devices, may be used to facilitate various operations and processes described herein and to improve, optimize, or maximize various aspects thereof. For example, one or more robotic arms may be dedicated to placing or removing containers with respect to trays, and/or one or more robotic arms may be dedicated to inducting or picking items with respect to containers. Further, one or more robotic arms may be dedicated to operations involving particular types of items or containers, e.g., heavy or bulky items, small or fragile items, heavy or rigid totes or bins, light or flexible boxes or bags, or various other types of items or containers.

In addition, one or more towers and/or one or more storage modules may be designated for particular operations or processes, e.g., item storage containers, item sortation containers, customer order containers, transship containers for other facilities, or various other operations or processes. Further, various containers and/or items may be transferred or moved, e.g., using one or more robotic arms having associated end effectors, between towers and/or storage modules designated for different particular operations or processes. Furthermore, the one or more towers may have different sizes, shapes, or configurations, such as different numbers of storage modules, different numbers, sizes, or shapes of trays, different types of trays configured to receive different types of containers, or other variations of portions of the towers.

In further example embodiments, one or more towers of storage modules and/or one or more robotic arms may be sized or configured to be mobile, e.g., carried by movable platforms or mobile drive units. In such embodiments, various configurations or arrangements of one or more towers and/or one or more robotic arms may be created or formed as requested or desired, e.g., substantially in real-time, to perform various operations or processes, such as by moving and/or clustering one or more towers and/or robotic arms at particular locations as desired. In this manner, the rotary sortation and storage systems described herein may be highly flexible and responsive to demand, e.g., customer demand and/or downstream demand by various stations or processes, by reconfiguring and rearranging desired towers and desired robotic arms to perform operations at any time and any location within a facility that is accessible by the mobile towers and/or mobile robotic arms.

Figure 8:
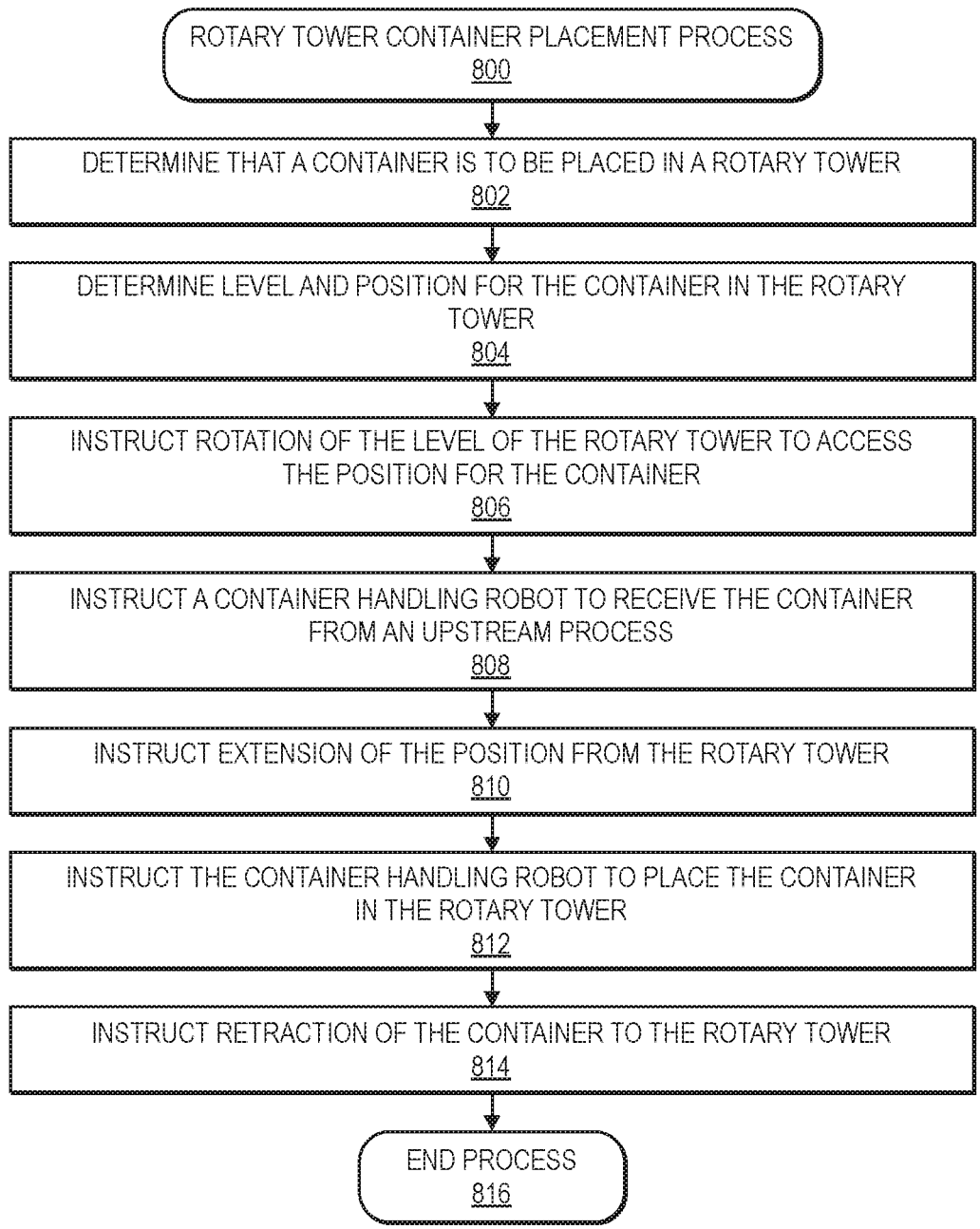
FIG. 8 is a flow diagram illustrating an example rotary tower container placement process, in accordance with disclosed implementations.

FIG. 8 is a flow diagram illustrating an example rotary tower container placement process 800, in accordance with disclosed implementations.

The process 800 may begin by determining that a container is to be placed in a rotary tower, as at 802. For example, the container may be empty or may contain one or more items. The container may be placed in a particular rotary tower to facilitate various operations or processes, such as item sortation, item storage, fulfilling customer orders, transshipping to other facilities, or other operations or processes. In addition, the particular rotary tower in which the container is to be placed may be selected or determined, e.g., by a control system, based on stored data associated with the storage modules, trays, containers, and/or items stored with respect to the rotary tower.

The process 800 may continue by determining a level and position for the container in the rotary tower, as at 804. For example, the container may be placed in a particular storage module and on a particular tray of the storage module to facilitate various operations or processes, such as item sortation, item storage, fulfilling customer orders, transshipping to other facilities, or other operations or processes. In addition, the particular storage module and tray in which the container is to be placed may be selected or determined, e.g., by a control system, based on stored data associated with the storage modules, trays, containers, and/or items stored with respect to the rotary tower.

The process 800 may proceed by instructing rotation of the level of the rotary tower to access the position for the container, as at 806. For example, an actuator or motor associated with the selected storage module of the rotary tower may be instructed or commanded, e.g., by a control system, to rotate or move the storage module of the rotary tower, such that the selected tray may be positioned near or adjacent to a container handling robot. In addition, the direction and/or amount of rotation or movement of the selected storage module in which the container is to be placed may be determined, e.g., by the control system, based on stored data associated with the storage modules, trays, containers, and/or items stored with respect to the rotary tower.

The process 800 may then continue to instruct a container handling robot to receive the container from an upstream process, as at 808. For example, the container handling robot having an associated end effector, which may comprise a pair of forks or other types of end effectors described herein, may receive, grasp, or lift the container to be placed on the selected tray of the selected storage module of the rotary tower. In addition, the various movements, grasping, and/or lifting of the container by the container handling robot may be instructed or commanded, e.g., by a control system. The upstream process may comprise various types of upstream stations or processes, such as conveyors, carts, slides, chutes, empty container stations, container receive stations, container sort or storage stations, or other stations or processes. Further, an imaging device may capture imaging data of the container from the upstream process, and a control system may process the imaging data of the container, in order to facilitate grasping and lifting of the container by the container handling robot. Various image processing algorithms or techniques, such as edge, surface, feature, text, character, symbol, object, or other detection algorithms or techniques, may be performed by the control system to process the imaging data.

The process 800 may then proceed to instruct extension of the position from the rotary tower, as at 810. For example, an actuator or motor associated with the selected tray of the selected storage module of the rotary tower may be instructed or commanded, e.g., by a control system, to extend the tray of the storage module, such that the selected tray may be open or accessible to receive a container from the container handling robot. In addition, the amount of extension of the selected tray on which the container is to be placed may be determined, e.g., by the control system, based on stored data associated with the storage modules, trays, containers, and/or items stored with respect to the rotary tower, and/or stored data associated with the container handling robot, associated end effector, and/or the container to be placed.

The process 800 may then continue with instructing the container handling robot to place the container in the rotary tower, as at 812. For example, the container handling robot having an associated end effector, which may comprise a pair of forks or other types of end effectors described herein, may move and place the container on the selected, extended tray of the selected storage module of the rotary tower. In addition, the various movements and/or placement of the container by the container handling robot may be instructed or commanded, e.g., by a control system. Further, an imaging device may capture imaging data of the selected, extended tray during movement and placement of the container, and a control system may process the imaging data of the selected, extended tray, in order to facilitate movement and placement of the container by the container handling robot. Moreover, the control system may further process the imaging data to determine any errors associated with the placement of the container, and/or to confirm proper placement of the container on the selected tray. Various image processing algorithms or techniques, such as edge, surface, feature, text, character, symbol, object, or other detection algorithms or techniques, may be performed by the control system to process the imaging data.

The process 800 may then proceed with instructing retraction of the container to the rotary tower, as at 814. For example, an actuator or motor associated with the selected tray of the selected storage module of the rotary tower may be instructed or commanded, e.g., by a control system, to retract the tray and container of the storage module, such that the selected tray and container may be positioned within the storage module of the rotary tower. In addition, the amount of retraction of the selected tray on which the container is placed may be determined, e.g., by the control system, based on stored data associated with the storage modules, trays, containers, and/or items stored with respect to the rotary tower, and/or stored data associated with the container that is placed. The process may then end, as at 816.

Figure 9:
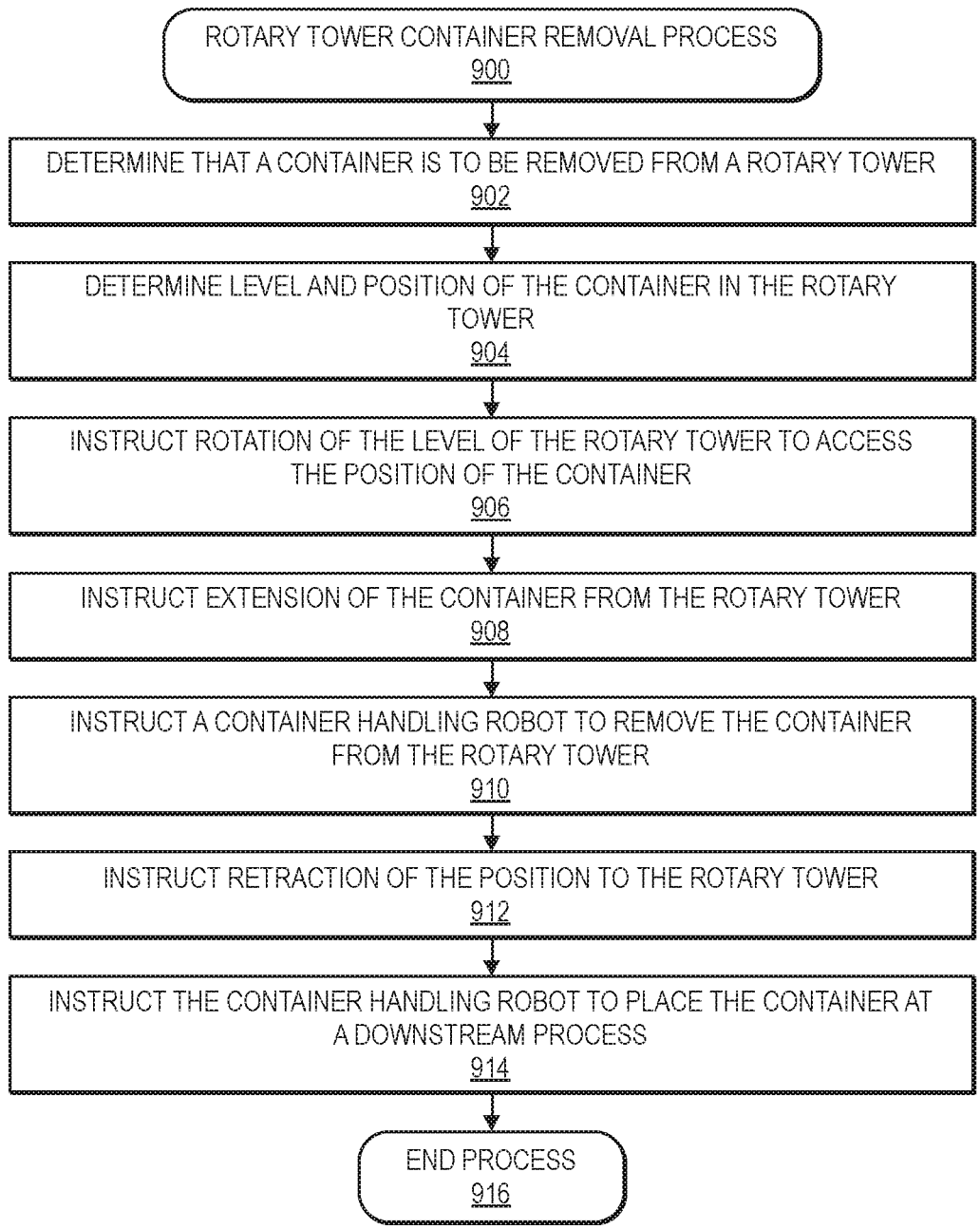
FIG. 9 is a flow diagram illustrating an example rotary tower container removal process, in accordance with disclosed implementations.

FIG. 9 is a flow diagram illustrating an example rotary tower container removal process 900, in accordance with disclosed implementations.

The process 900 may begin by determining that a container is to be removed from a rotary tower, as at 902. For example, the container may be empty or may contain one or more items. The container may be removed from a particular rotary tower to facilitate various operations or processes, such as item sortation, item storage, fulfilling customer orders, transshipping to other facilities, or other operations or processes. In addition, the particular rotary tower from which the container is to be removed may be selected or determined, e.g., by a control system, based on stored data associated with the storage modules, trays, containers, and/or items stored with respect to the rotary tower.

The process 900 may continue by determining a level and position of the container in the rotary tower, as at 904. For example, the container may be removed from a particular storage module and from a particular tray of the storage module to facilitate various operations or processes, such as item sortation, item storage, fulfilling customer orders, transshipping to other facilities, or other operations or processes. In addition, the particular tray and storage module from which the container is to be removed may be selected or determined, e.g., by a control system, based on stored data associated with the storage modules, trays, containers, and/or items stored with respect to the rotary tower.

The process 900 may proceed by instructing rotation of the level of the rotary tower to access the position of the container, as at 906. For example, an actuator or motor associated with the selected storage module of the rotary tower may be instructed or commanded, e.g., by a control system, to rotate or move the storage module of the rotary tower, such that the selected container and tray may be positioned near or adjacent to a container handling robot. In addition, the direction and/or amount of rotation or movement of the selected storage module from which the container is to be removed may be determined, e.g., by the control system, based on stored data associated with the storage modules, trays, containers, and/or items stored with respect to the rotary tower.

The process 900 may then continue to instruct extension of the container from the rotary tower, as at 908. For example, an actuator or motor associated with the selected container and tray of the selected storage module of the rotary tower may be instructed or commanded, e.g., by a control system, to extend the tray of the storage module, such that the selected tray may be open or accessible to remove the container by a container handling robot. In addition, the amount of extension of the selected tray from which the container is to be removed may be determined, e.g., by the control system, based on stored data associated with the storage modules, trays, containers, and/or items stored with respect to the rotary tower, and/or stored data associated with the container handling robot, associated end effector, and/or the container to be removed.

The process 900 may then proceed to instruct the container handling robot to remove the container from the rotary tower, as at 910. For example, the container handling robot having an associated end effector, which may comprise a pair of forks or other types of end effectors described herein, may grasp and lift the container from the selected, extended tray of the selected storage module of the rotary tower. In addition, the various movements, grasping, and/or lifting of the container by the container handling robot may be instructed or commanded, e.g., by a control system. Further, an imaging device may capture imaging data of the selected, extended tray during grasping and lifting of the container, and a control system may process the imaging data of the selected, extended tray, in order to facilitate grasping and lifting of the container by the container handling robot. Moreover, the control system may further process the imaging data to determine any errors associated with the removal of the container, and/or to confirm proper removal of the container from the selected tray. Various image processing algorithms or techniques, such as edge, surface, feature, text, character, symbol, object, or other detection algorithms or techniques, may be performed by the control system to process the imaging data.

The process 900 may then continue with instructing retraction of the position to the rotary tower, as at 912. For example, an actuator or motor associated with the selected tray of the selected storage module of the rotary tower may be instructed or commanded, e.g., by a control system, to retract the tray of the storage module, such that the selected tray may be positioned within the storage module of the rotary tower. In addition, the amount of retraction of the selected tray from which the container has been removed may be determined, e.g., by the control system, based on stored data associated with the storage modules, trays, containers, and/or items stored with respect to the rotary tower.

The process 900 may then proceed with instructing the container handling robot to place the container at a downstream process, as at 914. For example, the container handling robot having an associated end effector, which may comprise a pair of forks or other types of end effectors described herein, may move and place the container that is removed from the selected tray of the selected storage module of the rotary tower. In addition, the various movements and/or placement of the container by the container handling robot may be instructed or commanded, e.g., by a control system. The downstream process may comprise various types of downstream stations or processes, such as conveyors, carts, slides, chutes, empty container stations, container sort or storage stations, container packing or shipping stations, or other stations or processes. Further, an imaging device may capture imaging data of the container at the downstream process, and a control system may process the imaging data of the container, in order to facilitate movement and placement of the container by the container handling robot. Various image processing algorithms or techniques, such as edge, surface, feature, text, character, symbol, object, or other detection algorithms or techniques, may be performed by the control system to process the imaging data. The process may then end, as at 916.

Figure 10:
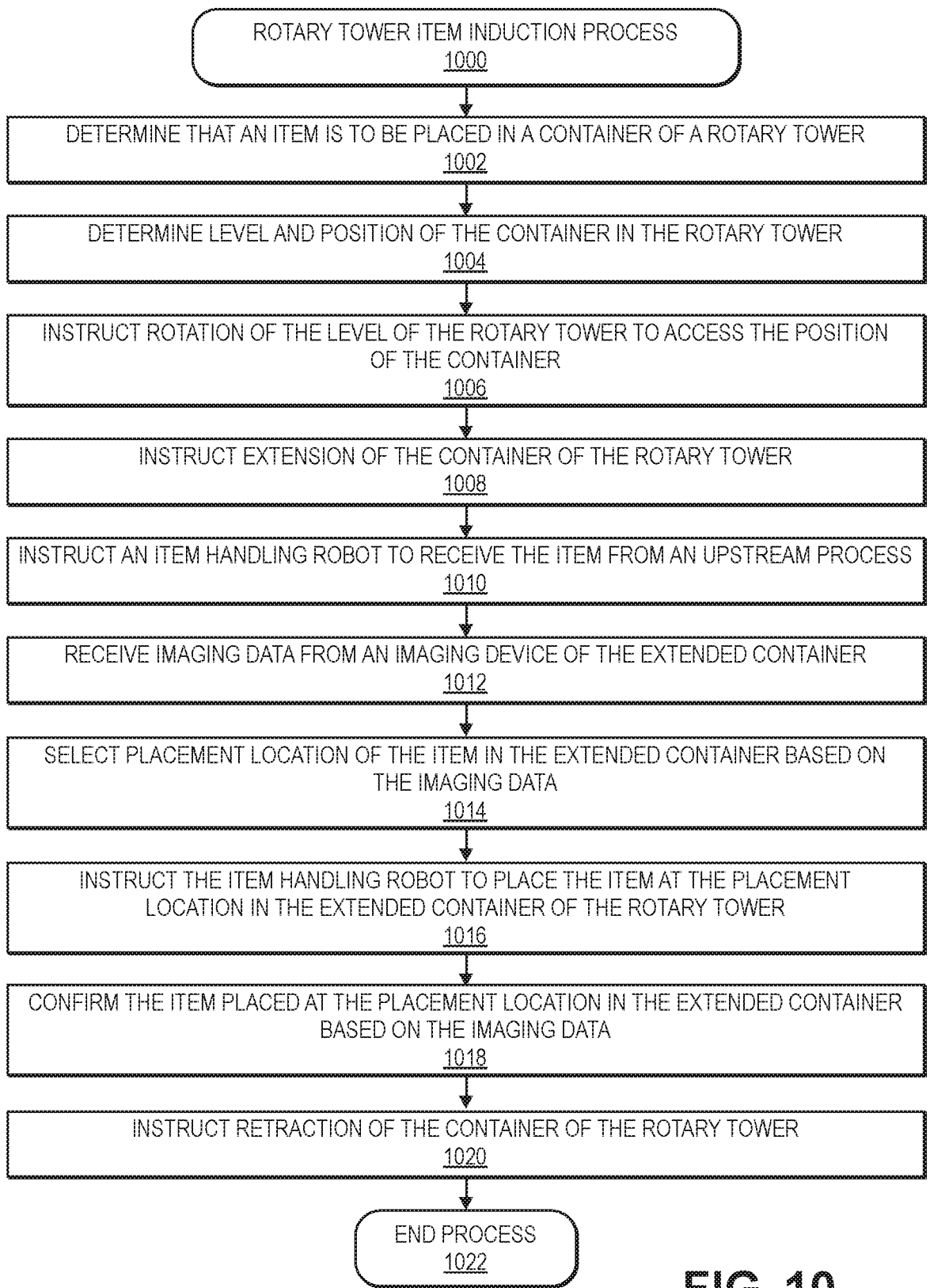
FIG. 10 is a flow diagram illustrating an example rotary tower item induction process, in accordance with disclosed implementations.

FIG. 10 is a flow diagram illustrating an example rotary tower item induction process 1000, in accordance with disclosed implementations.

The process 1000 may begin by determining that an item is to be placed in a container of a rotary tower, as at 1002. For example, the item may be various types of items, products, or objects, such as books, apparel, electronics, furnishings, packaged products, unpackaged products, or various other types of items or products. The item may be placed in a particular container of a particular rotary tower to facilitate various operations or processes, such as item sortation, item storage, fulfilling customer orders, transshipping to other facilities, or other operations or processes. In addition, the particular container of the particular rotary tower in which the item is to be placed may be selected or determined, e.g., by a control system, based on stored data associated with the storage modules, trays, containers, and/or items stored with respect to the rotary tower.

The process 1000 may continue by determining a level and position of the container in the rotary tower, as at 1004. For example, the item may be placed in a particular storage module and in a particular container of a particular tray of the storage module to facilitate various operations or processes, such as item sortation, item storage, fulfilling customer orders, transshipping to other facilities, or other operations or processes. In addition, the particular storage module and container in which the item is to be placed may be selected or determined, e.g., by a control system, based on stored data associated with the storage modules, trays, containers, and/or items stored with respect to the rotary tower.

The process 1000 may proceed by instructing rotation of the level of the rotary tower to access the position of the container, as at 1006. For example, an actuator or motor associated with the selected storage module of the rotary tower may be instructed or commanded, e.g., by a control system, to rotate or move the storage module of the rotary tower, such that the selected tray and container may be positioned near or adjacent to an item handling robot. In addition, the direction and/or amount of rotation or movement of the selected storage module and container in which the item is to be placed may be determined, e.g., by the control system, based on stored data associated with the storage modules, trays, containers, and/or items stored with respect to the rotary tower.

The process 1000 may then continue to instruct extension of the container of the rotary tower, as at 1008. For example, an actuator or motor associated with the selected tray and container of the selected storage module of the rotary tower may be instructed or commanded, e.g., by a control system, to extend the tray of the storage module, such that the selected container may be open or accessible to receive an item from an item handling robot. In addition, the amount of extension of the selected tray and container in which the item is to be placed may be determined, e.g., by the control system, based on stored data associated with the storage modules, trays, containers, and/or items stored with respect to the rotary tower, and/or stored data associated with the item handling robot, associated end effector, and/or the item to be placed.

The process 1000 may then proceed to instruct an item handling robot to receive the item from an upstream process, as at 1010. For example, the item handling robot having an associated end effector, which may comprise one or more crossbelt conveyors or other types of end effectors described herein, may receive, grasp, or lift the item to be placed in the selected container of the selected tray of the selected storage module of the rotary tower. In addition, the various movements, grasping, and/or lifting of the item by the item handling robot may be instructed or commanded, e.g., by a control system. The upstream process may comprise various types of upstream stations or processes, such as conveyors, carts, totes, bins, slides, chutes, item preparation stations, item receive stations, item sort or storage stations, or other stations or processes. Further, an imaging device may capture imaging data of the item from the upstream process, and a control system may process the imaging data of the item, in order to facilitate receiving, grasping, or lifting of the item by the item handling robot. Various image processing algorithms or techniques, such as edge, surface, feature, text, character, symbol, object, or other detection algorithms or techniques, may be performed by the control system to process the imaging data.

The process 1000 may then continue with receiving imaging data from an imaging device of the extended container, as at 1012. For example, an imaging device may capture imaging data, e.g., from an overhead view, of the selected, extended tray and container. In addition, a control system may process the imaging data to identify the container, identify one or more items in the container, determine item density of the container, identify the item to be placed by the item handling robot, determine a placement location for the item by the item handling robot, and/or to perform various other operations or processes. Various image processing algorithms or techniques, such as edge, surface, feature, text, character, symbol, object, or other detection algorithms or techniques, may be performed by the control system to process the imaging data.

The process 1000 may then proceed with selecting a placement location of the item in the extended container based at least in part on the imaging data, as at 1014. For example, a control system may process the imaging data and select or determine a placement location within the selected, extended container at which to place the item by the item handling robot, which may be based on aspects of the item, such as weight, size, shape, item type, or other aspects, aspects of one or more items within the container, and/or item density within the container. In addition, the amount of extension of the selected tray and container in which the item is to be placed may be determined, e.g., by the control system, based at least in part on the imaging data, in order to place the item by the item handling robot at the selected placement location. Further, the selected tray and container may be actuated, e.g., by the control system, to extend and/or retract at particular rates or durations to move or shift one or more items within the container, in order to select or determine a placement location for the item, e.g., by spreading out or separating one or more items within the container, or by bunching together or aggregating one or more items within the container. Various image processing algorithms or techniques, such as edge, surface, feature, text, character, symbol, object, or other detection algorithms or techniques, may be performed by the control system to process the imaging data.

The process 1000 may then continue with instructing the item handling robot to place the item at the placement location in the extended container of the rotary tower, as at 1016. For example, the item handling robot having an associated end effector, which may comprise one or more crossbelt conveyors or other types of end effectors described herein, may move and place the item at the placement location in the selected, extended container of the selected tray of the selected storage module of the rotary tower. In addition, the various movements and/or placement of the item by the item handling robot may be instructed or commanded, e.g., by a control system. Further, an imaging device may capture imaging data of the selected, extended container and tray during movement and placement of the item, and a control system may process the imaging data of the selected, extended container and tray, in order to facilitate movement and placement of the item at the placement location by the item handling robot. Moreover, the control system may further process the imaging data to determine any errors associated with the placement of the item, and/or to confirm proper placement of the item in the selected container and tray, as at 1018. Various image processing algorithms or techniques, such as edge, surface, feature, text, character, symbol, object, or other detection algorithms or techniques, may be performed by the control system to process the imaging data.

The process 1000 may then proceed with instructing retraction of the container of the rotary tower, as at 1020. For example, an actuator or motor associated with the selected tray and container of the selected storage module of the rotary tower may be instructed or commanded, e.g., by a control system, to retract the tray and container of the storage module, such that the selected tray and container may be positioned within the storage module of the rotary tower. In addition, the amount of retraction of the selected tray and container in which the item is placed may be determined, e.g., by the control system, based on stored data associated with the storage modules, trays, containers, and/or items stored with respect to the rotary tower, and/or stored data associated with the item that is placed. The process may then end, as at 1022.

Figure 11:
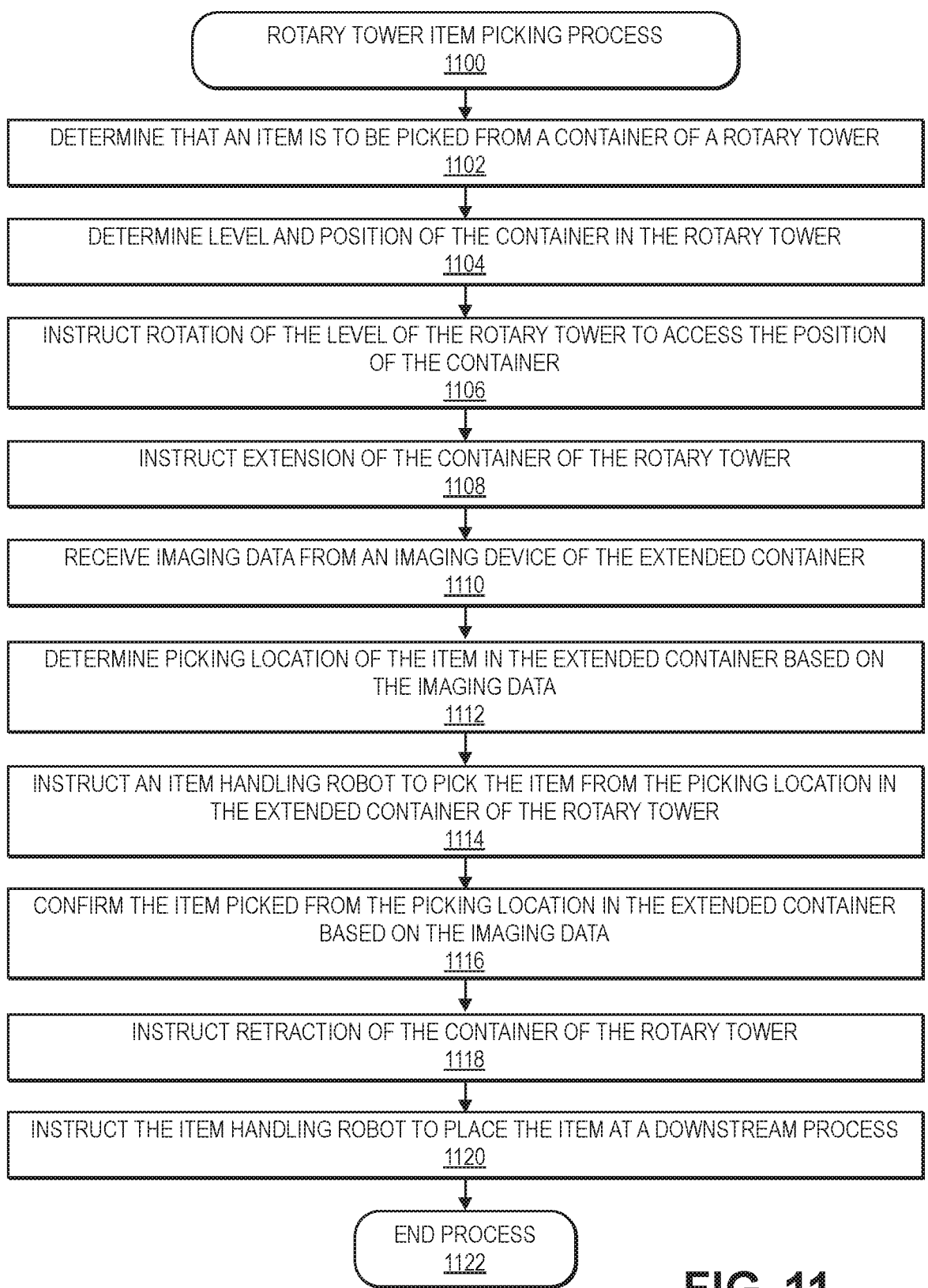
FIG. 11 is a flow diagram illustrating an example rotary tower item picking process, in accordance with disclosed implementations.

FIG. 11 is a flow diagram illustrating an example rotary tower item picking process 1100, in accordance with disclosed implementations.

The process 1100 may begin by determining that an item is to be picked from a container of a rotary tower, as at 1102. For example, the item may be various types of items, products, or objects, such as books, apparel, electronics, furnishings, packaged products, unpackaged products, or various other types of items or products. The item may be picked from a particular container of a particular rotary tower to facilitate various operations or processes, such as item sortation, item storage, fulfilling customer orders, transshipping to other facilities, or other operations or processes. In addition, the particular container of the particular rotary tower from which the item is to be removed may be selected or determined, e.g., by a control system, based on stored data associated with the storage modules, trays, containers, and/or items stored with respect to the rotary tower.

The process 1100 may continue by determining a level and position of the container in the rotary tower, as at 1104. For example, the item may be removed from a particular storage module and from a particular container of a particular tray of the storage module to facilitate various operations or processes, such as item sortation, item storage, fulfilling customer orders, transshipping to other facilities, or other operations or processes. In addition, the particular storage module and container from which the item is to be removed may be selected or determined, e.g., by a control system, based on stored data associated with the storage modules, trays, containers, and/or items stored with respect to the rotary tower.

The process 1100 may proceed by instructing rotation of the level of the rotary tower to access the position of the container, as at 1106. For example, an actuator or motor associated with the selected storage module of the rotary tower may be instructed or commanded, e.g., by a control system, to rotate or move the storage module of the rotary tower, such that the selected tray and container may be positioned near or adjacent to an item handling robot. In addition, the direction and/or amount of rotation or movement of the selected storage module and container from which the item is to be removed may be determined, e.g., by the control system, based on stored data associated with the storage modules, trays, containers, and/or items stored with respect to the rotary tower.

The process 1100 may then continue to instruct extension of the container of the rotary tower, as at 1108. For example, an actuator or motor associated with the selected tray and container of the selected storage module of the rotary tower may be instructed or commanded, e.g., by a control system, to extend the tray of the storage module, such that the selected container may be open or accessible to remove an item by an item handling robot. In addition, the amount of extension of the selected tray and container from which the item is to be removed may be determined, e.g., by the control system, based on stored data associated with the storage modules, trays, containers, and/or items stored with respect to the rotary tower, and/or stored data associated with the item handling robot, associated end effector, and/or the item to be removed.

The process 1100 may then proceed to receive imaging data from an imaging device of the extended container, as at 1110. For example, an imaging device may capture imaging data, e.g., from an overhead view, of the selected, extended tray and container. In addition, a control system may process the imaging data to identify the container, identify one or more items in the container, determine item density of the container, identify the item to be removed by the item handling robot, determine a picking or removal location of the item by the item handling robot, and/or to perform various other operations or processes. Various image processing algorithms or techniques, such as edge, surface, feature, text, character, symbol, object, or other detection algorithms or techniques, may be performed by the control system to process the imaging data.

The process 1100 may then continue with determining a picking location of the item in the extended container based at least in part on the imaging data, as at 1112. For example, a control system may process the imaging data and select or determine a picking location within the selected, extended container from which to remove the item by the item handling robot, which may be based on aspects of the item, such as weight, size, shape, item type, or other aspects, aspects of one or more items within the container, and/or item density within the container. In addition, the amount of extension of the selected tray and container from which the item is to be removed may be determined, e.g., by the control system, based at least in part on the imaging data, in order to remove the item by the item handling robot from the selected picking location. Further, the selected tray and container may be actuated, e.g., by the control system, to extend and/or retract at particular rates or durations to move or shift one or more items within the container, in order to select or determine a picking location for the item, e.g., by spreading out or separating one or more items within the container, or by bunching together or aggregating one or more items within the container. Various image processing algorithms or techniques, such as edge, surface, feature, text, character, symbol, object, or other detection algorithms or techniques, may be performed by the control system to process the imaging data.

The process 1100 may then proceed with instructing an item handling robot to pick the item from the picking location in the extended container of the rotary tower, as at 1114. For example, the item handling robot having an associated end effector, which may comprise one or more grasping arms, suction grippers, or other types of end effectors described herein, may grasp and pick the item from the picking location in the selected, extended container of the selected tray of the selected storage module of the rotary tower. In addition, the various movements and/or picking of the item by the item handling robot may be instructed or commanded, e.g., by a control system. Further, an imaging device may capture imaging data of the selected, extended container and tray during movement and picking of the item, and a control system may process the imaging data of the selected, extended container and tray, in order to facilitate movement and picking of the item from the picking location by the item handling robot. Moreover, the control system may further process the imaging data to determine any errors associated with the picking of the item, and/or to confirm proper picking of the item from the selected container and tray, as at 1116. Various image processing algorithms or techniques, such as edge, surface, feature, text, character, symbol, object, or other detection algorithms or techniques, may be performed by the control system to process the imaging data.

The process 1100 may then continue with instructing retraction of the container of the rotary tower, as at 1118. For example, an actuator or motor associated with the selected tray and container of the selected storage module of the rotary tower may be instructed or commanded, e.g., by a control system, to retract the tray and container of the storage module, such that the selected tray and container may be positioned within the storage module of the rotary tower. In addition, the amount of retraction of the selected tray and container from which the item is removed may be determined, e.g., by the control system, based on stored data associated with the storage modules, trays, containers, and/ or items stored with respect to the rotary tower, and/or stored data associated with the item that is removed.

The process 1100 may then proceed to instruct the item handling robot to place the item at a downstream process, as at 1120. For example, the item handling robot having an associated end effector, which may comprise one or more grasping arms, suction grippers, or other types of end effectors described herein, may move or place the item that is removed from the selected container of the selected tray of the selected storage module of the rotary tower. In addition, the various movements and/or placement of the item by the item handling robot may be instructed or commanded, e.g., by a control system. The downstream process may comprise various types of downstream stations or processes, such as conveyors, carts, totes, bins, slides, chutes, item preparation stations, item sort or storage stations, item packing or shipping stations, or other stations or processes. Further, an imaging device may capture imaging data of the item at the downstream process, and a control system may process the imaging data of the item, in order to facilitate movement or placement of the item by the item handling robot. Various image processing algorithms or techniques, such as edge, surface, feature, text, character, symbol, object, or other detection algorithms or techniques, may be performed by the control system to process the imaging data. The process may then end, as at 1022.

Figure 12:
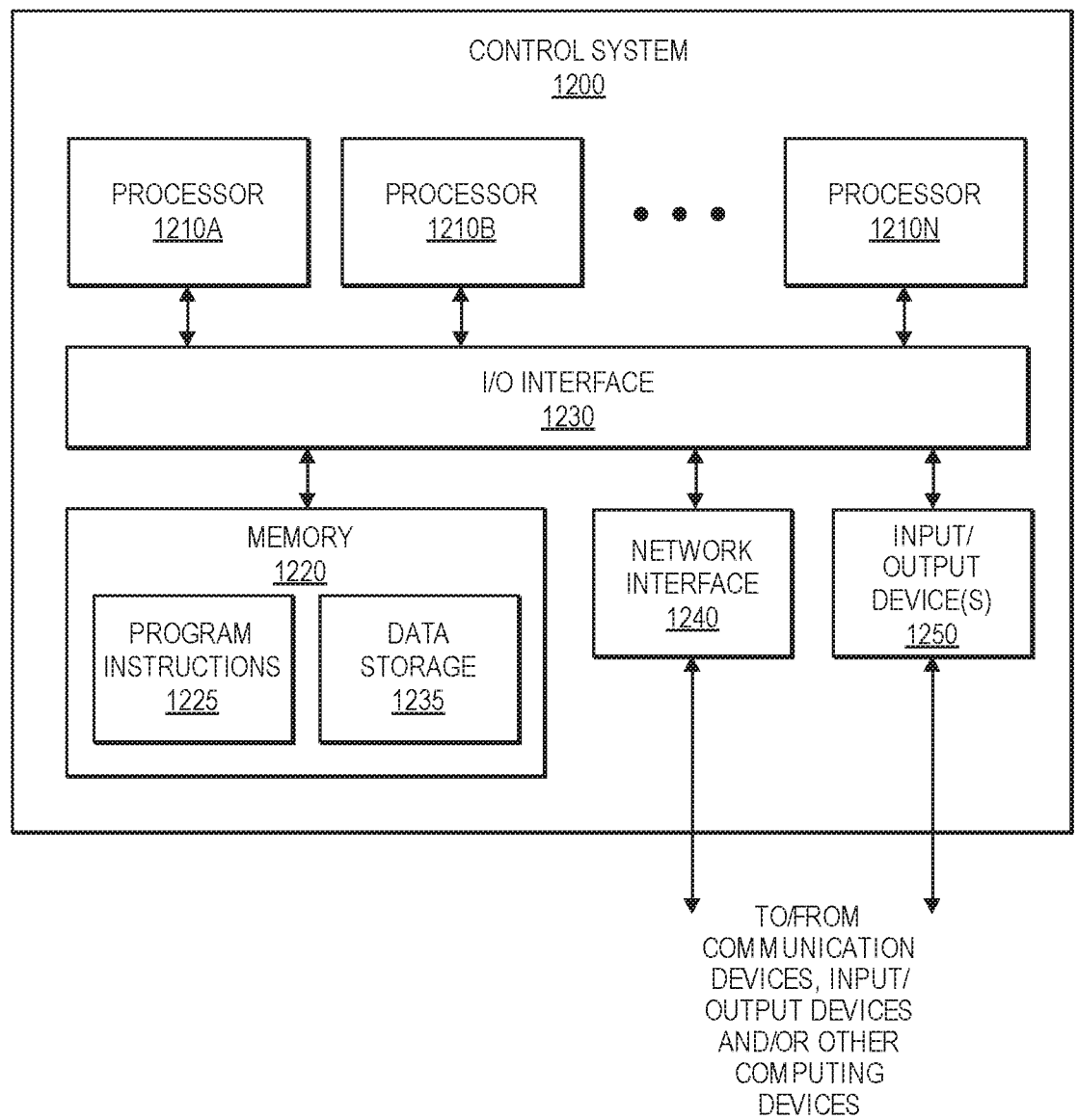
FIG. 12 is a block diagram illustrating an example control system, in accordance with disclosed implementations.

FIG. 12 is a block diagram illustrating an example control system 1200, in accordance with disclosed implementations.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 12. In the illustrated implementation, a control system 1200 includes one or more processors 1210A, 1210B through 1210N, coupled to a non-transitory computer-readable storage medium 1220 via an input/output (I/O) interface 1230. The control system 1200 further includes a network interface 1240 coupled to the I/O interface 1230, and one or more input/output devices 1250. In some implementations, it is contemplated that a described implementation may be implemented using a single instance of the control system 1200 while, in other implementations, multiple such systems or multiple nodes making up the control system 1200 may be configured to host different portions or instances of the described implementations. For example, in one implementation, some data sources or services (e.g., related to portions of a rotary sortation and storage system, operations, or processes, etc.) may be implemented via one or more nodes of the control system 1200 that are distinct from those nodes implementing other data sources or services (e.g., related to other portions of a rotary sortation and storage system, operations, or processes, etc.).

In various implementations, the control system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer-readable storage medium 1220 or the control system 1200. Generally speaking, a non-transitory, computer-readable storage medium may include storage media or memory media such as magnetic or optical media, e.g., disk or CD/DVD-ROM, coupled to the control system 1200 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The network interface 1240 may be configured to allow data to be exchanged between the control system 1200 and other devices attached to a network, such as other control systems, computer systems, towers, storage modules, trays, motors, actuators, or other actuation systems, robotic arms, manipulators, or systems, imaging sensors and systems, proximity sensors and systems, robotic or mobile drive units and systems, conveyors, other material handling systems or equipment, various other sensors and related systems, various upstream or downstream stations or processes, or between nodes of the control system 1200. In various implementations, the network interface 1240 may support communication via wired or wireless general data networks, such as any suitable type of Ethernet network.

Input/output devices 1250 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1200. Multiple input/output devices 1250 may be present in the control system 1200 or may be distributed on various nodes of the control system 1200. In some implementations, similar input/output devices may be separate from the control system 1200 and may interact with one or more nodes of the control system 1200 through a wired or wireless connection, such as over the network interface 1240.

As shown in FIG. 12, the memory 1220 may include program instructions 1225 that may be configured to implement one or more of the described implementations and/or provide data storage 1235, which may comprise various tables, data stores and/or other data structures accessible by the program instructions 1225. The program instructions 1225 may include various executable instructions, programs, or applications to facilitate rotary sortation and storage operations and processes described herein, such as storage module controllers, drivers, or applications, tray controllers, drivers, or applications, motor or actuator controllers, drivers, or applications, robotic arm, manipulator, or apparatus controllers, drivers, or applications, end of arm tool or end effector controllers, drivers, or applications, imaging sensor or other sensor controllers, drivers, or applications, imaging data processing algorithms, techniques, or applications, sensor data processing applications, other material handling equipment or apparatus controllers, drivers, or applications, etc. The data storage 1235 may include various data stores for maintaining data related to systems, operations, or processes described herein, such as tower configurations, storage module configurations, tray configurations, container data, associations between containers and trays, storage modules, and towers, item data, associations between items and containers, trays, storage modules, and towers, actuators or motors of storage modules, position or movement data of storage modules, actuators or motors of trays, position or movement data of trays, robotic arms, manipulators, or apparatus, end of arm tools or end effectors, actuators, motors, sensors, imaging sensors, sensor data, imaging data, various identifications, selections, and/or determinations based on processing and analysis of the imaging data, item placement locations, item picking locations, conveyors and other material handling equipment or apparatus, upstream stations or processes, downstream stations or processes, etc.

Those skilled in the art will appreciate that the control system 1200 is merely illustrative and is not intended to limit the scope of implementations. In particular, the control system and devices may include any combination of hardware or software that can perform the indicated functions, including computers, network devices, internet appliances, robotic devices, etc. The control system 1200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A rotary sortation and storage system, comprising:
a central beam;
a plurality of storage modules coupled to the central beam, each of the plurality of storage modules including a respective plurality of trays arranged around the central beam, wherein each of the plurality of trays is configured to receive a container;
an item handling robot; and
a control system configured to at least:
determine that a first item manipulated by the item handling robot is to be placed in a first container;
determine a first storage module of the plurality of storage modules associated with the first container;
determine a first tray of the plurality of trays of the first storage module associated with the first container;
instruct rotation of the first storage module around the central beam to enable access to the first tray by the item handling robot;
instruct extension of the first tray radially relative to the central beam to enable access to the first container by the item handling robot; and
instruct placement, by the item handling robot, of the first item in the first container associated with the first tray.

2. The rotary sortation and storage system of claim 1, wherein the control system is further configured to at least:
responsive to placement, by the item handling robot, of the first item in the first container associated with the first tray:
instruct retraction of the first tray radially relative to the central beam.

3. The rotary sortation and storage system of claim 1, wherein the control system is further configured to at least:
responsive to extension of the first tray radially relative to the central beam to enable access to the first container by the item handling robot:
instruct an imaging device to capture first imaging data of the first container associated with the first tray; and
determine a first placement location for the first item within the first container based at least in part on the first imaging data;
wherein the first item is placed, by the item handling robot, at the first placement location within the first container associated with the first tray.

4. The rotary sortation and storage system of claim 3, wherein the control system is further configured to at least:
responsive to placement, by the item handling robot, of the first item in the first container associated with the first tray:
instruct the imaging device to capture second imaging data of the first item placed at the first placement location within the first container associated with the first tray; and
confirm placement of the first item at the first placement location within the first container associated with the first tray based at least in part on the second imaging data.

5. A system, comprising:
a central beam; and
a storage module coupled to the central beam, the storage module including a plurality of trays arranged around the central beam, wherein each of the plurality of trays is configured to receive a container;
wherein the storage module includes an actuator configured to bidirectionally rotate the plurality of trays around the central beam; and
wherein the plurality of trays are configured to:
rotate around the central beam; and
extend or retract substantially radially relative to the central beam.

6. The system of claim 5, wherein the system comprises a plurality of storage modules, each of the plurality of storage modules including a respective actuator configured to independently, bidirectionally rotate a respective plurality of trays around the central beam.

7. The system of claim 5, further comprising:
a container handling robot configured to place or remove containers relative to the plurality of trays;
wherein the container handling robot includes an end effector comprising at least one of grasping arms, container forks, or a crossbelt sorter.

8. The system of claim 7, further comprising:
a control system configured to at least:
determine that a first container manipulated by the container handling robot is to be placed on a first tray of the storage module;
instruct rotation of the plurality of trays of the storage module around the central beam to enable access to the first tray by the container handling robot;
instruct extension of the first tray substantially radially relative to the central beam to enable access to the first tray by the container handling robot; and
instruct placement, by the container handling robot, of the first container on the first tray of the storage module.

9. The system of claim 7, further comprising:
a control system configured to at least:
determine that a second container is to be removed, by the container handling robot, from a second tray of the storage module;
instruct rotation of the plurality of trays of the storage module around the central beam to enable access to the second tray by the container handling robot;
instruct extension of the second tray substantially radially relative to the central beam to enable access to the second container by the container handling robot; and
instruct removal, by the container handling robot, of the second container from the second tray of the storage module.

10. The system of claim 5, further comprising:
an item handling robot configured to induct or pick items relative to containers associated with the plurality of trays;

wherein the item handling robot includes an end effector comprising at least one of grasping arms, a suction gripper, or a crossbelt sorter.

11. The system of claim 10, further comprising:
a control system configured to at least:
  determine that a first item manipulated by the item handling robot is to be placed in a first container of the storage module;
  determine a first tray of the plurality of trays of the storage module associated with the first container;
  instruct rotation of the plurality of trays of the storage module around the central beam to enable access to the first tray by the item handling robot;
  instruct extension of the first tray substantially radially relative to the central beam to enable access to the first container by the item handling robot; and
  instruct placement, by the item handling robot, of the first item in the first container associated with the first tray.

12. The system of claim 10, further comprising:
a control system configured to at least:
  determine that a second item is to be removed, by the item handling robot, from a second container of the storage module;
  determine a second tray of the plurality of trays of the storage module associated with the second container;
  instruct rotation of the plurality of trays of the storage module around the central beam to enable access to the second tray by the item handling robot;
  instruct extension of the second tray substantially radially relative to the central beam to enable access to the second container by the item handling robot; and
instruct removal, by the item handling robot, of the second item from the second container associated with the second tray.

13. The system of claim 5, further comprising:
a control system configured to at least:
  instruct rotation of the plurality of trays of the storage module and instruct extension of a first tray of the storage module to enable access to the first tray by a first agent.

14. The system of claim 13, further comprising:
a second storage module coupled to the central beam, the second storage module including a second plurality of trays arranged around the central beam, wherein each of the second plurality of trays is configured to receive a container;
wherein the second plurality of trays are configured to:
  rotate around the central beam; and
  extend or retract substantially radially relative to the central beam; and
wherein the control system is further configured to at least:
  at least partially concurrently with the rotation of the plurality of trays of the storage module and the extension of the first tray of the storage module to enable access to the first tray by the first agent, instruct rotation of the second plurality of trays of the second storage module and instruct extension of a second tray of the second storage module to enable access to the second tray by a second agent.

15. A system, comprising:
a central beam; and
a storage module coupled to the central beam, the storage module including a plurality of trays arranged around the central beam, wherein each of the plurality of trays is configured to receive a container;
wherein the plurality of trays are configured to:
  rotate around the central beam; and
  extend or retract substantially radially relative to the central beam; and
wherein each of the plurality of trays includes a respective actuator configured to independently extend or retract a respective tray substantially radially relative to the central beam.

16. A method, comprising:
determining, by a control system, that a first item manipulated by an agent is to be placed in a first container of a storage module, the storage module coupled to a central beam and including a plurality of trays arranged around the central beam, wherein each of the plurality of trays is configured to receive a container;
determining, by the control system, a first tray of the plurality of trays of the storage module associated with the first container;
instructing, by the control system, rotation of the storage module around the central beam to enable access to the first tray by the agent;
instructing, by the control system, extension of the first tray substantially radially relative to the central beam to enable access to the first container by the agent; and
instructing, by the control system, placement of the first item, by the agent, in the first container associated with the first tray.

17. The method of claim 16, further comprising:
responsive to extension of the first tray substantially radially relative to the central beam to enable access to the first container by the agent:
  instructing, by the control system, an imaging device to capture first imaging data of the first container associated with the first tray; and
  determining, by the control system, a placement location for the first item within the first container based at least in part on the first imaging data;
  wherein the first item is placed, by the agent, at the placement location within the first container associated with the first tray.

18. The method of claim 16, further comprising:
determining, by the control system, that a second item is to be removed, by the agent, from a second container of the storage module;
determining, by the control system, a second tray of the plurality of trays of the storage module associated with the second container;
instructing, by the control system, rotation of the storage module around the central beam to enable access to the second tray by the agent;
instructing, by the control system, extension of the second tray substantially radially relative to the central beam to enable access to the second container by the agent; and
instructing, by the control system, removal of the second item, by the agent, from the second container associated with the second tray.

19. The method of claim 18, further comprising:
responsive to extension of the second tray substantially radially relative to the central beam to enable access to the second container by the agent:
  instructing, by the control system, the imaging device to capture second imaging data of the second container associated with the second tray; and
  determining, by the control system, a removal location of the second item within the second container based at least in part on the second imaging data;

wherein the second item is removed, by the agent, from the removal location within the second container associated with the second tray.

\* \* \* \* \*